United States Patent
Kim et al.

(10) Patent No.: US 9,786,296 B2
(45) Date of Patent: Oct. 10, 2017

(54) METHOD AND APPARATUS FOR ASSIGNING KEYWORD MODEL TO VOICE OPERATED FUNCTION

(71) Applicant: QUALCOMM Incorporated, San Diego, CA (US)

(72) Inventors: Taesu Kim, Seongnam (KR); Minsub Lee, Seoul (KR)

(73) Assignee: QUALCOMM Incorporated, San Diego, CA (US)

(*) Notice: Subject to any disclaimer, the term of this patent is extended or adjusted under 35 U.S.C. 154(b) by 440 days.

(21) Appl. No.: 14/101,869

(22) Filed: Dec. 10, 2013

(65) Prior Publication Data

US 2015/0012279 A1    Jan. 8, 2015

Related U.S. Application Data

(60) Provisional application No. 61/843,650, filed on Jul. 8, 2013.

(51) Int. Cl.

| | |
|---|---|
| *G10L 15/14* | (2006.01) |
| *G10L 21/00* | (2013.01) |
| *G10L 25/00* | (2013.01) |
| *G10L 25/48* | (2013.01) |
| *G10L 15/22* | (2006.01) |
| *G10L 13/00* | (2006.01) |

(52) U.S. Cl.
CPC .............. *G10L 25/48* (2013.01); *G10L 15/22* (2013.01); *G10L 13/00* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 5,054,082 A | 10/1991 | Smith et al. | |
| 5,983,184 A | 11/1999 | Noguchi | |
| 6,092,192 A * | 7/2000 | Kanevsky | G06F 21/32 |
| | | | 382/115 |
| 6,128,482 A * | 10/2000 | Nixon | G10L 15/18 |
| | | | 379/354 |

(Continued)

FOREIGN PATENT DOCUMENTS

WO    03073417 A2    9/2003

OTHER PUBLICATIONS

International Search Report and Written Opinion—PCT/US2014/045193—ISA/EPO—dated Nov. 6, 2014, 17 pages.

*Primary Examiner* — Richemond Dorvil
*Assistant Examiner* — Thuykhanh Le
(74) *Attorney, Agent, or Firm* — Toler Law Group, P.C.

(57) ABSTRACT

A method, performed in an electronic device, for assigning a target keyword to a function is disclosed. In this method, a list of a plurality of target keywords is received at the electronic device via a communication network, and a particular target keyword is selected from the list of target keywords. Further, the method may include receiving a keyword model for the particular target keyword via the communication network. In this method, the particular target keyword is assigned to a function of the electronic device such that the function is performed in response to detecting the particular target keyword based on the keyword model in an input sound received at the electronic device.

30 Claims, 17 Drawing Sheets

(56) References Cited

U.S. PATENT DOCUMENTS

| | | | |
|---|---|---|---|
| 6,442,519 B1 | 8/2002 | Kanevsky et al. | |
| 6,810,378 B2 | 10/2004 | Kochanski et al. | |
| 7,099,825 B1 | 8/2006 | Cook | |
| 7,437,294 B1* | 10/2008 | Thenthiruperai | 704/231 |
| 7,451,085 B2 | 11/2008 | Rose et al. | |
| 7,499,892 B2* | 3/2009 | Aoyama | G06N 3/08 704/232 |
| 7,603,276 B2 | 10/2009 | Yoshizawa | |
| 7,634,064 B2* | 12/2009 | Odinak | G10L 15/30 379/406.03 |
| 7,643,998 B2* | 1/2010 | Yuen | H04M 3/4938 704/270 |
| 7,689,417 B2 | 3/2010 | Huang et al. | |
| 7,706,510 B2 | 4/2010 | Ng | |
| 7,831,431 B2* | 11/2010 | Huang | G10L 15/28 455/412.1 |
| 8,234,120 B2* | 7/2012 | Agapi | G10L 15/075 381/2 |
| 8,255,224 B2* | 8/2012 | Singleton | G10L 15/08 704/251 |
| 2002/0059068 A1* | 5/2002 | Rose | G10L 15/08 704/246 |
| 2003/0005412 A1* | 1/2003 | Eanes | G06F 8/34 717/120 |
| 2003/0144841 A1* | 7/2003 | Shao | G10L 15/22 704/251 |
| 2006/0173683 A1 | 8/2006 | Roth et al. | |
| 2007/0050191 A1* | 3/2007 | Weider | G06F 17/30864 704/275 |
| 2007/0100635 A1* | 5/2007 | Mahajan | G10L 15/22 704/276 |
| 2008/0235024 A1 | 9/2008 | Goldberg et al. | |
| 2009/0132920 A1* | 5/2009 | Deyo | G06F 9/4446 715/708 |
| 2011/0184730 A1* | 7/2011 | LeBeau | G10L 15/30 704/201 |
| 2011/0295590 A1* | 12/2011 | Lloyd | G10L 15/065 704/8 |
| 2012/0130709 A1* | 5/2012 | Bocchieri | G10L 15/063 704/201 |
| 2012/0166195 A1* | 6/2012 | Hayakawa | G10L 17/04 704/240 |
| 2013/0085753 A1* | 4/2013 | Bringert | G10L 15/32 704/233 |
| 2013/0301069 A1* | 11/2013 | Yanagi | G06F 3/1204 358/1.13 |
| 2014/0088964 A1* | 3/2014 | Bellegarda | G10L 15/063 704/243 |
| 2014/0100847 A1* | 4/2014 | Ishii | G10L 15/32 704/236 |
| 2014/0108353 A1* | 4/2014 | Awe | G06F 11/1446 707/649 |
| 2014/0149895 A1* | 5/2014 | Bardhan | G06F 3/04817 715/763 |
| 2015/0088523 A1* | 3/2015 | Schuster | G10L 15/22 704/275 |
| 2016/0035352 A1* | 2/2016 | Furumoto | G01C 21/3608 704/276 |
| 2016/0044159 A1* | 2/2016 | Wolff | H04M 3/002 379/406.08 |

* cited by examiner

| TARGET KEYWORD | FUNCTION | ACK SOUND | VOICE TONE MODEL |
|---|---|---|---|
| SAY CHEESE | TAKE PHOTOGRAPH | BEEP | ROBOTIC VOICE |
| OPEN SESAME | UNLOCK DEVICE | BELL CHIME | FEMALE VOICE 1 |
| HEY ASSISTANT | ACTIVATE VOICE ASSISTANT | "MAY I HELP YOU?" | FEMALE VOICE 2 |
| START RECORDING | ACTIVATE VOICE RECORDER | RING TONE | MALE VOICE |
| ... | ... | ... | ... |

METHOD AND APPARATUS FOR ASSIGNING KEYWORD MODEL TO VOICE OPERATED FUNCTION

CROSS-REFERENCE TO RELATED APPLICATIONS

The present application claims priority from commonly owned U.S. Provisional Patent Application No. 61/843,650 filed on Jul. 8, 2013, the content of which is expressly incorporated herein by reference in its entirety.

TECHNICAL FIELD

The present disclosure generally relates to speech recognition in electronic devices, and more specifically, to recognizing a target keyword for performing a function in electronic devices.

BACKGROUND

Recently, the use of mobile devices such as smartphones and tablet computers has become widespread. These devices typically provide voice and/or data communication functionalities over wireless networks. In addition, such mobile devices typically include other features that provide a variety of functions designed to enhance user convenience.

One of the features in mobile devices that is being used increasingly is a speech recognition function. Such a function allows a mobile device to perform various functions when a voice command (e.g., a keyword) from a user is recognized. For example, the mobile device may activate a voice assistant application, play an audio file, or take a picture in response to the voice command from the user.

In conventional mobile devices, manufacturers or carriers often equip the devices with sound models that may be used to detect associated keywords. However, such devices generally include a limited number of sound models and keywords. Accordingly, users may be limited to using only the keywords and sound models as originally provided in the devices. In some devices, users may generate a sound model for detecting a new keyword by training the sound model based on a number of utterances for the keyword. Such sound models generated in response to a user input may not be very accurate in detecting the new keyword due, for example, to insufficient sampling of the keyword.

SUMMARY

The present disclosure provides methods and apparatus for assigning a target keyword to a function for performing the function when the target keyword is detected based on a keyword model associated with the target keyword.

According to one aspect of the present disclosure, a method for assigning a target keyword to a function is disclosed. In this method, a list of a plurality of target keywords is received at an electronic device via a communication network, and the target keyword is selected from the received list of the plurality of target keywords. Further, the method may include receiving a keyword model for the selected target keyword via the communication network, and assigning the target keyword to a function of the electronic device such that the function is performed in response to detecting the target keyword based on the keyword model in an input sound received at the electronic device. This disclosure also describes apparatus, a device, a system, a combination of means, and a computer-readable medium relating to this method.

According to another aspect of the present disclosure, a method for assigning a target keyword to an application is disclosed. In this method, a list of a plurality of applications is received via a communication network, and the application is selected from the received list of applications. Further, the method may include receiving an application file for the selected application via the communication unit, the application file including a keyword model for the target keyword, extracting the keyword model from the application file, and assigning the target keyword to the application for activating the application when the target keyword is detected in an input sound based on the keyword model. This disclosure also describes apparatus, a device, a system, a combination of means, and a computer-readable medium relating to this method.

According to still another aspect of the present disclosure, a method for providing data files is disclosed. In this method, a list of a plurality of target keywords is transmitted to an electronic device via a communication network, and a request for a selected target keyword is received from the electronic device via the communication network. Further, the method may include transmitting, to the electronic device, a keyword model for the selected target keyword via the communication network. The keyword model is adapted for detecting the selected target keyword in an input sound. This disclosure also describes apparatus, a device, a system, a combination of means, and a computer-readable medium relating to this method.

According to yet another aspect of the present disclosure, an electronic device includes a download management unit and a keyword setting unit. The download management unit is configured to receive, via a communication network, a keyword model for a particular target keyword selected from a list of a plurality of target keywords. The keyword setting unit is configured to assign the particular target keyword to a function of the electronic device such that the function is performed in response to detecting the particular target keyword based on the keyword model in an input sound received at the electronic device.

According to yet another aspect of the present disclosure, an electronic device includes a download management unit, an extracting unit, and a keyword setting unit. The download management unit is configured to receive, via a communication network, an application file for an application selected from a list of a plurality of applications. The application file includes a keyword model for a target keyword. The extracting unit is configured to extract the keyword model from the application file. The keyword setting unit is configured to assign the target keyword to the selected application for activating the application when the target keyword is detected in an input sound based on the keyword model.

According to yet another aspect of the present disclosure, a server includes a database, a communication unit, and a control unit. The database is configured to store at least one target keyword and at least one keyword model. The keyword model is adapted for detecting the associated target keyword in an input sound. The communication unit is configured to transmit, to an electronic device, a list of the at least one target keyword and receive, from the electronic device, a request for a target keyword selected from the list of the at least one target keyword. The control unit is configured to access the database in response to the request and transmit, to the electronic device, a keyword model associated with the selected target keyword among the at least one keyword model via the communication unit.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Figure 1:
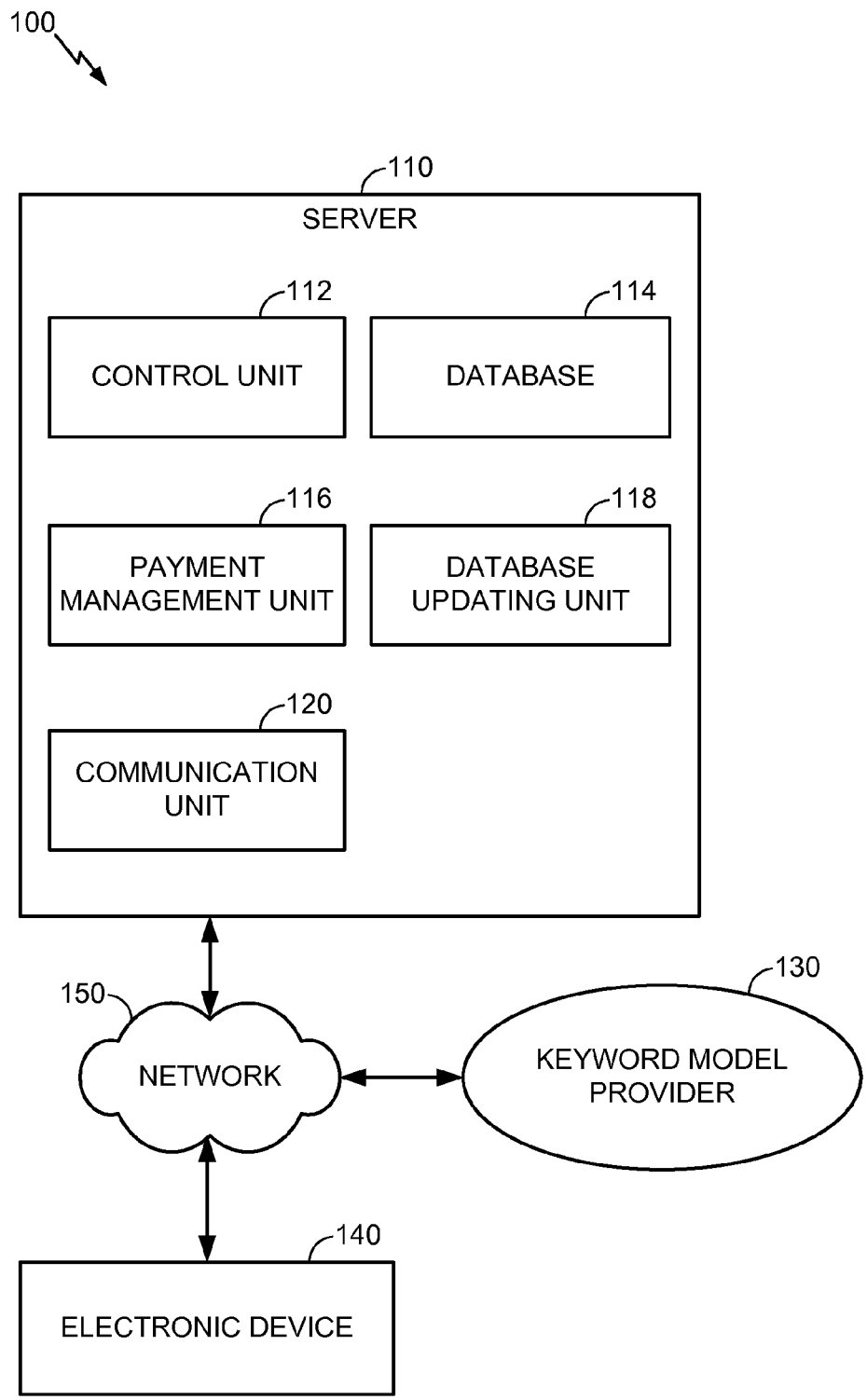
FIG. 1 illustrates a system for providing a plurality of keyword models in a server that can be downloaded by an electronic device via a communication network for use in detecting target keywords, according to one embodiment of the present disclosure.

FIG. 1 illustrates a system 100 for providing a plurality of keyword models in a server 110, according to one embodiment of the present disclosure. The system 100 includes the server 110, an electronic device 140, and a keyword model provider 130, which communicate via a communication network 150. The server 110 includes a control unit 112, a database 114, a payment management unit 116, a database updating unit 118, and a communication unit 120.

The keyword models can be downloaded by the electronic device 140 via the communication network 150 for use in detecting target keywords. As used herein, the term "target keyword" refers to any digital or analog representation of one or more words or sound that can be used as a keyword to activate or perform a function in the electronic device 140. A "keyword model" refers to data that can be used by the electronic device 140 to detect a target keyword. In a particular embodiment, the keyword model is not user-specific and does not include a full language model. For example, the keyword model may include data to model fewer than all phonemes of a language of the target keyword. In this example, the keyword model includes data to detect a subset of the phonemes of the language of the target keyword. Thus, the keyword model may be significantly smaller than a full language model. To illustrate, the keyword model may use between 1 and 500 kilobits (KB) of memory whereas storing a full language model may use one or more megabits (MB).

In the server 110, the control unit 112 controls overall operations of the server 110. The database 114 in the server 110 stores a plurality of keyword data files uploaded by the keyword model provider 130. Each of the keyword data files may include a keyword model for use in detecting a target keyword, Ack sound data (or response sound data) for outputting an acknowledgement sound or a response sound indicating a detection of the target keyword, a voice tone model adapted to modify the voice tone of speech generated from text, or a combination thereof. The keyword models, which are uploaded by the keyword model provider 130, may be generated based on a training of a large number of keyword recordings so that the keyword models can be optimized for detecting associated target keywords. Thus, a user of the electronic device 140 may use a keyword model based on a large number of keyword recordings by downloading the keyword model. The user thus gains the benefit of increased accuracy provided by training the keyword model with a large number of keyword recordings without the user having to record the keyword recordings to train the keyword model. In a particular embodiment, the electronic device 140 may include a keyword detection engine that is configured to continuously monitor input sound for user input. In this embodiment, users expect the electronic device 140 to have a high detection rate (e.g., over 90%) and a low false detection rate (e.g., less than 0.01%). Having a low false detection rate improves user experience and may reduce power consumption. For example, false detections may cause the electronic device 140 to activate functions that the user does not desire to be active, which can be an annoyance and can increase power consumption of the electronic device 140. Achieving such high detection rates and low false detection rates may require extensive training of keyword models. For example, in some cases a keyword detection model that achieves a 90% detection rate with less than 0.01% false detection rate may use thousands of keyword recordings and tens of thousands of non-keyword recordings.

The database 114 may also include information related to the keyword models such as ratings, the number of downloads, providers of the keyword models, and the like. In one embodiment, the database 114 may also store application files for installing applications in the electronic device 140. In this embodiment, an application file may include a keyword model that may be used in detecting a target keyword and activating the application upon detection of the target keyword.

In some embodiments, the server 110 may be configured to host an online store for providing target keywords to various types of electronic devices via the communication network 150. The online store may be a dedicated store for providing keyword models or may be implemented as a part of a general application store. The online store may also provide a search function for locating a target keyword that may be of interest to a user.

The payment management unit 116 in the server 110 allows users to select and purchase keyword models from the server 110. In one embodiment, the payment management unit 116 may be integrated with a third party billing service such as a telephone billing service, Internet billing service, etc. In another embodiment, the payment management unit 116 may be implemented as a separate payment server in communication with the server 110 via the communication network 150.

The server 110 is configured to communicate with the electronic device 140 and the keyword model provider 130 via the communication unit 120, which functions as a network interface to the communication network 150. In this configuration, the server 110 may receive a new keyword data file including a new keyword model for use in detecting a new target keyword from the keyword model provider 130. The new keyword data file may also include new Ack sound data and a new voice tone model associated with the new target keyword. Upon receiving the new keyword data file, the database updating unit 118 may update the database 114 by adding the new keyword data file. In another embodiment, the database updating unit 118 may receive a new keyword model along with associated Ack sound data and a voice tone model from the keyword model provider 130, and generate a new keyword data file.

A user of the electronic device 140 may access a list of available target keywords in the server 110 via the communication network 150. When the user selects a target keyword from the list of available target keywords, the electronic device 140 transmits a request for a keyword model associated with the selected target keyword to the server 110 via the communication network 150. In response to the request, the server 110 transmits a keyword data file including the keyword model associated with the selected target keyword to the electronic device 140. After receiving the keyword model, the user may assign the target keyword to a function of the electronic device 140 such that the function is performed when the target keyword is detected in an input sound based on the keyword model.

Figure 2:
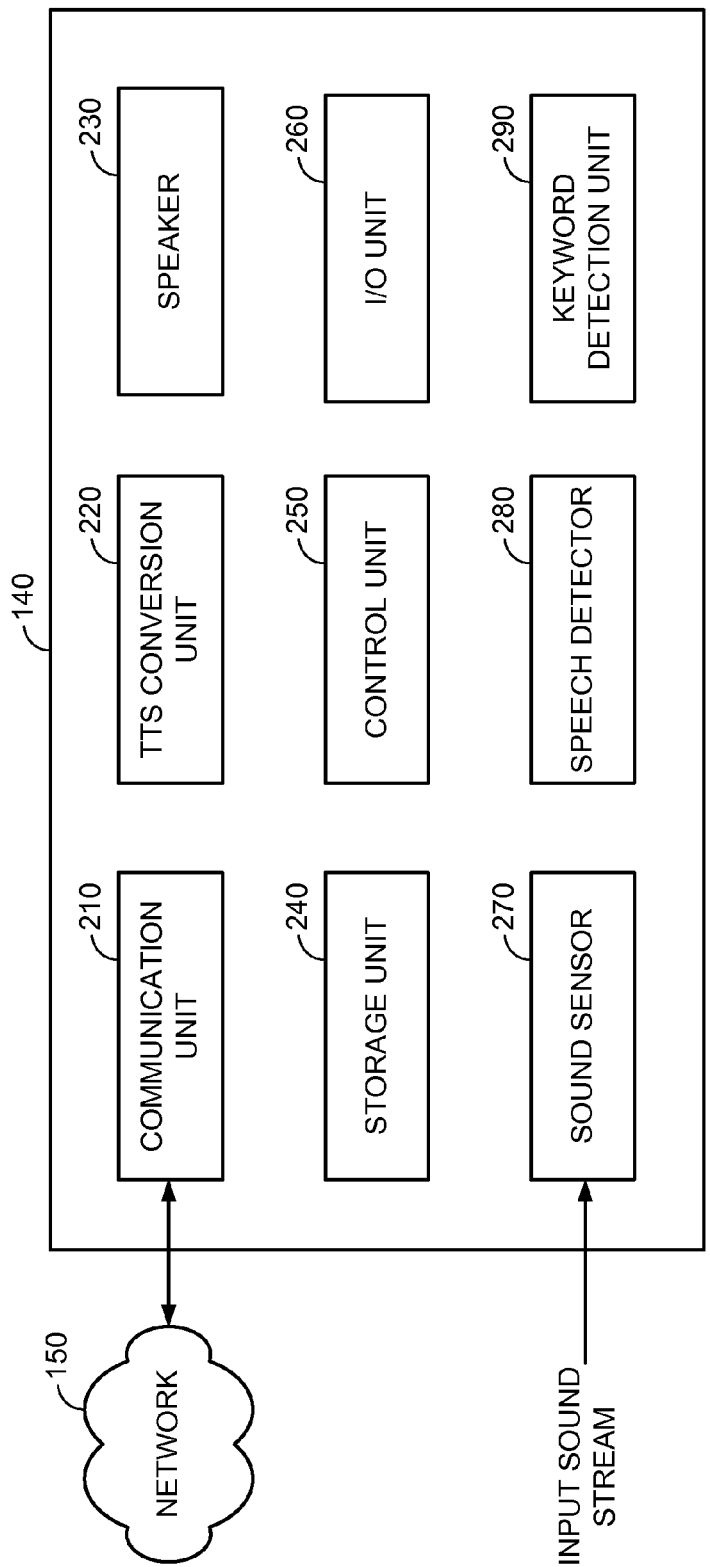
FIG. 2 depicts a block diagram of an electronic device configured to access a plurality of target keywords and to download a keyword model for use in detecting a selected target keyword from an input sound steam according to one embodiment of the present disclosure.

FIG. 2 depicts a block diagram of the electronic device 140 configured to access a plurality of target keywords and download a keyword model for use in detecting a selected target keyword from an input sound stream according to one embodiment of the present disclosure. As used herein, the term "sound stream" refers to a sequence of one or more sound signals or sound data. The electronic device 140 includes a communication unit 210, a TTS (text-to-speech) conversion unit 220, a speaker 230, a storage unit 240, a control unit 250, an input/output (I/O) unit 260 (e.g., a user interface unit), a sound sensor 270, a speech detector 280, and a keyword detection unit 290. The electronic device 140 may be any suitable device equipped with a sound capturing and processing capability such as a cellular phone, a smartphone, a personal computer, a laptop computer, a tablet computer, a smart television, a gaming device, a multimedia player, etc.

The electronic device 140 may communicate with the server 110 via the communication unit 210, which functions as a network interface to the communication network 150. In this process, the electronic device 140 may access the plurality of target keywords in the server 110. When a user on the electronic device 140 selects a target keyword from a list of the plurality of target keywords via the I/O unit 260, the electronic device 140 transmits a request for the selected target keyword to the server 110. In response, the server 110 transmits a keyword data file including a keyword model associated with the selected target keyword to the electronic device 140. The keyword data file may also include Ack sound data and a voice tone model associated with the selected target keyword.

The control unit 250 in the electronic device 140 is configured to receive the keyword data file and extract the keyword model, the Ack sound data, and the voice tone model from the keyword data file. The extracted keyword model, Ack sound data, and voice tone model are then stored in the storage unit 240. The storage unit 240 may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive). In this manner, the user may download a plurality of keyword models for use in detecting associated target keywords. The storage unit 240 may also store one or more other keywords and associated keyword models that are originally provided in the electronic device 140.

Once a keyword data file including a keyword model has been downloaded and stored, the user may assign a target keyword associated with the keyword model to a selected function in the electronic device 140 via the I/O unit 260. In response, the control unit 250 associates the keyword model for the target keyword with the selected function such that the selected function is performed when the target keyword is detected in an input sound stream based on the keyword model. It should be appreciated that the electronic device 140 may include a plurality of functions (e.g., applications, features, etc.), and any of the functions may be selected and associated with a target keyword for performing the selected function. For example, such a function may be one of activating a voice assistant application, taking a photograph, unlocking the electronic device 140, activating a voice recorder application, activating a camera application, activating a music player application, and the like.

The electronic device 140 may detect a target keyword in the input sound stream based on a keyword model for the target keyword. The sound sensor 270 in the electronic device 140 is configured to receive the input sound stream that may include the target keyword and provide the input sound stream to the speech detector 280. The sound sensor 270 may include one or more microphones or any other types of sound sensors that can be used to receive, capture, sense, and/or detect a sound input to the electronic device 140. In addition, the sound sensor 270 may employ any suitable software and/or hardware for performing such functions.

In one embodiment, the sound sensor 270 may be configured to receive the input sound stream periodically according to a duty cycle. In this case, the sound sensor 270 may determine whether the received portion of the input sound stream exceeds a threshold sound intensity. When the received portion of the sound stream exceeds the threshold intensity, the sound sensor 270 activates the speech detector 280 and provides the received portion to the speech detector 280. Alternatively, the sound sensor 270 may receive a portion of the input sound stream periodically (e.g., according to the duty cycle) and activate the speech detector 280 to provide the received portion to the speech detector 280 (e.g., irrespective of the sound intensity). As a further alternative, the sound sensor 270 may continuously receive the input sound stream (e.g., according to a 100% duty cycle) and activate the speech detector 280 when the received portion of the input sound exceeds the threshold sound intensity.

The speech detector 280 is configured to receive the portion of the input sound stream from the sound sensor 270. In one embodiment, the speech detector 280 extracts a plurality of sound features from the received portion and determines whether the extracted sound features indicate sound of interest such as speech by using any suitable sound classification method such as a Gaussian mixture model (GMM) based classifier, a neural network, a hidden Markov model (HMM), a graphical model, and a Support Vector Machine (SVM) technique. If the received portion is determined to be sound of interest, the speech detector 280 activates the keyword detection unit 290 and the received portion and the remaining portion of the input sound stream are provided to the keyword detection unit 290. In some other embodiments, the speech detector 280 may be omitted in electronic device 140. In this case, when the received portion exceeds the threshold intensity, the sound sensor 270 activates the keyword detection unit 290 and provides the received portion and the remaining portion of the input sound stream directly to the keyword detection unit 290. In an alternative, when the speech detector 280 is omitted, the sound sensor 270 may provide substantially all of the input sound stream directly to the keyword detection unit 290 (e.g., irrespective of the sound intensity).

The keyword detection unit 290, when activated, is configured to receive the input sound stream and detect the target keyword based on the keyword model. When the target keyword is detected in the input sound stream, the keyword detection unit 290 generates a detection signal indicating a target keyword that has been detected and transmits the detection signal to the control unit 250. In response to the detection signal, the control unit 250 performs the function associated with the detected target keyword. The keyword detection unit 290 may be configured to detect a plurality of target keywords based on a plurality of keyword models. In this case, the plurality of keyword models may be combined in a keyword detection model (e.g., a combined keyword model), which will be described in detail below.

The control unit 250 may also retrieve Ack sound data and a voice tone model associated with the target keyword from the storage unit 240. In this case, the control unit 250 may generate an acknowledgement sound from the retrieved Ack sound data for output via the speaker 230 to indicate detection of the target keyword. The TTS conversion unit 220 is configured to receive the voice tone model from the control unit 250 and modify a voice tone of the TTS conversion unit 220 based on the received voice tone model. The TTS conversion unit 220 then converts text, which may be output to the user, to speech with the modified voice tone and outputs the speech via the speaker 230.

Figure 3:
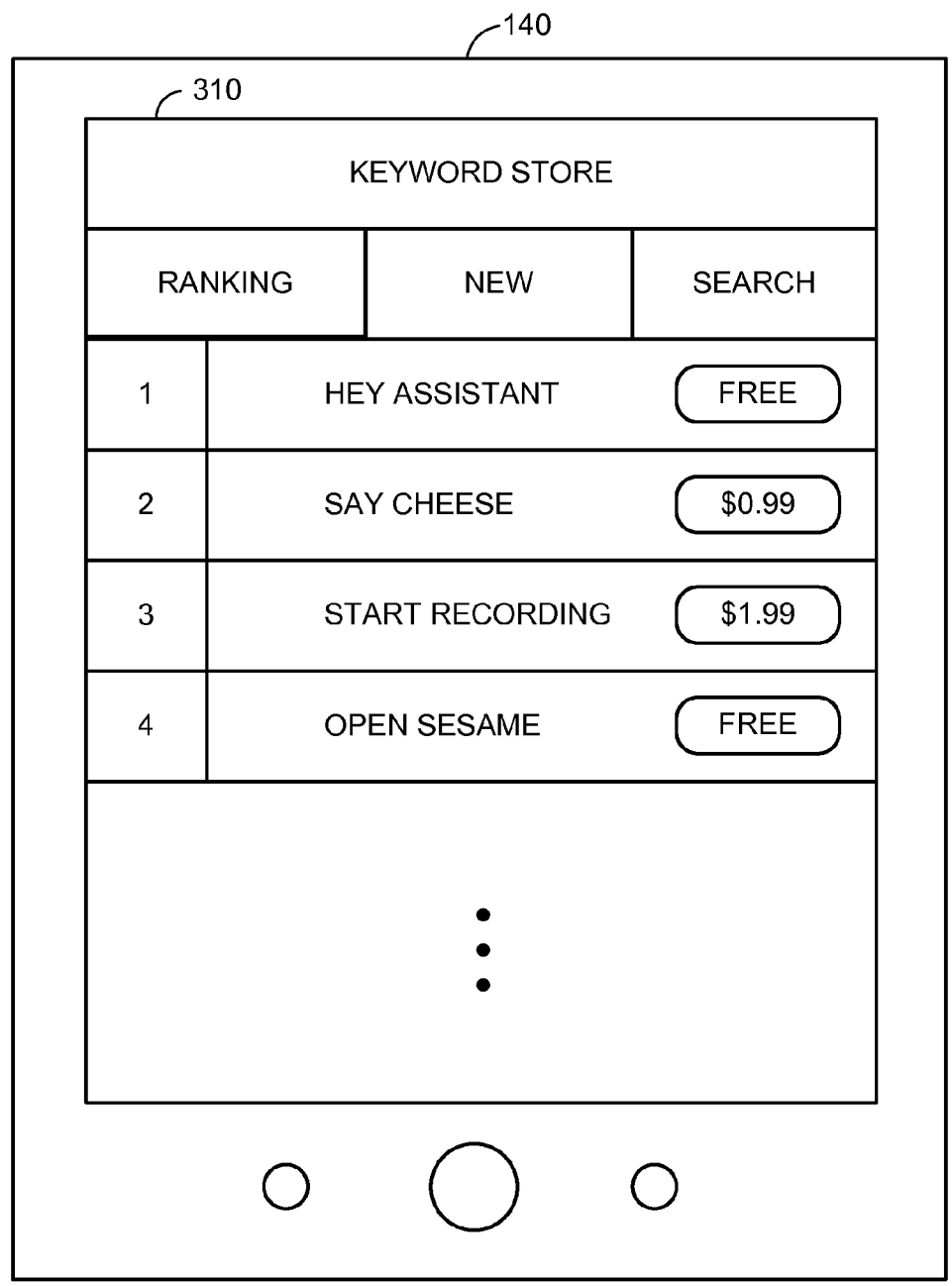
FIG. 3 illustrates a list of target keywords on a display screen of an electronic device that may be selected and downloaded to the electronic device for detecting the selected target keywords, according to one embodiment of the present disclosure.

FIG. 3 illustrates a list of target keywords on a display screen 310 of the electronic device 140 that may be selected and downloaded to the electronic device 140 for detecting the selected target keywords, according to one embodiment of the present disclosure. A keyword store provides the list of target keywords from the server 110. In an upper portion of the keyword store, a plurality of menu tabs such as "RANKING, "NEW," and "SEARCH" may be displayed. In the embodiment of FIG. 3, when the menu tab "RANKING" is selected by a user input (e.g., touch input on the display screen 310) as indicated by a thick line at a bottom portion of the "RANKING" menu tab, the electronic device 140 displays a list of target keywords which are sorted based on their ratings. In this case, a target keyword having a higher rating (e.g., "HEY ASSISTANT") is displayed before a target keyword having a lower rating (e.g., "SAY CHEESE").

In some embodiments, the list of target keywords may be displayed with their prices for download. In the embodiment of FIG. 3, target keywords "HEY ASSISTANT" and "OPEN SESAME" are free for download and thus are indicated as "FREE" in their right portions. On the other hand, target keywords "SAY CHEESE" and "START RECORDING" are $0.99 and $1.99 for download, respectively, and their prices are displayed in the right portions of the target keywords. When the user selects a target keyword from the list of target keywords, the electronic device 140 downloads a keyword data file including a keyword model for use in detecting the selected target keyword (after payment processing, if needed). The keyword data file may also include Ack sound data and a voice tone model associated with the selected target keyword.

In another embodiment, the menu tab "NEW" may be selected to display a list of target keywords in the order that they are uploaded to the server 110. Alternatively, when the menu tab "SEARCH" is selected, a search function is provided by displaying a search window or a search box for locating a target keyword that may be of interest to the user. In this case, the user may input a search term into the search window or search box and the electronic device 140 displays one or more target keywords on the display screen 310 in response to the search term.

Figure 4:
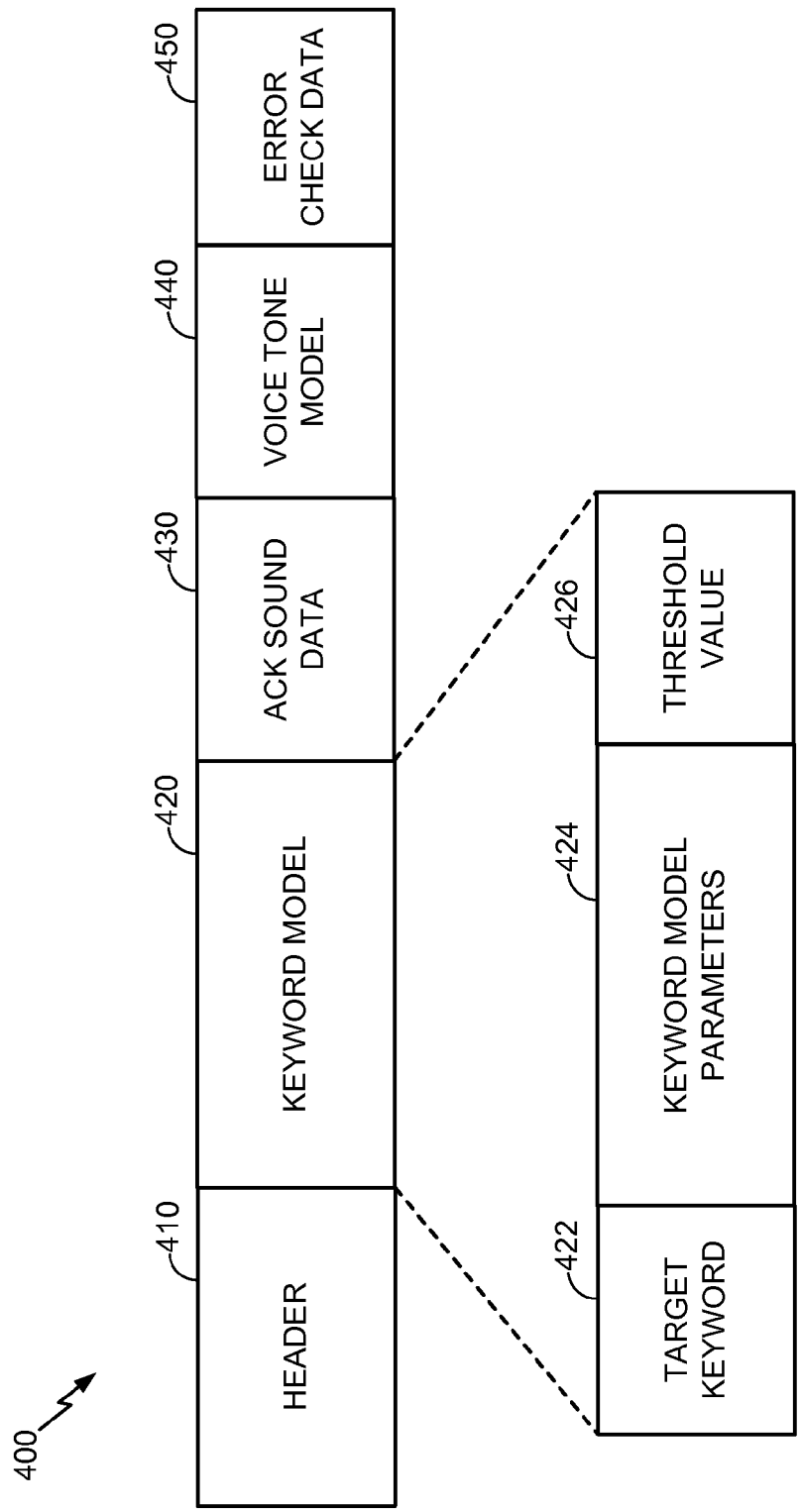
FIG. 4 illustrates an exemplary keyword data file including a header, a keyword model, Ack sound data, a voice tone model, and error check data, according to one embodiment of the present disclosure.

FIG. 4 illustrates an exemplary keyword data file 400 including a header 410, a keyword model 420, Ack sound data 430, a voice tone model 440, and error check data 450, according to one embodiment of the present disclosure. The header 410 may include information related to the keyword model 420 such as provider information, a data size, data type, date of creation, etc. The header 410 may further include compatibility information or version information for compatibility check. In this case, the compatibility or version information may indicate a type of the keyword model 420 (e.g., a model generated based on an HMM method), applicable recognition algorithms for the keyword model 420, etc.

As illustrated in FIG. 4, the keyword model 420 includes a target keyword 422, keyword model parameters 424, and a threshold value 426. The target keyword 422 may be a text string or one or more words. The keyword model parameters 424 indicate sound characteristics of the target keyword 422 and may be generated based on a training of a large number of keyword recordings so that the keyword model 420 can be optimized for detecting the target keyword 422. For example, keyword recordings from a number of persons may be used for the training. In a particular embodiment, the keyword model 420 is non-user specific and includes information (e.g., the keyword model parameters 424) to model fewer than all phonemes of a language of the target keyword 422.

In some embodiments, the keyword model parameters 424 include state information for a plurality of states associated with a plurality of portions of the target keyword. In one embodiment, the target keyword 422 may be divided into a plurality of basic units of sound such as phones, phonemes, or subunits thereof, and the plurality of portions representing the target keyword 422 may be generated based on the basic units of sound. Each portion of the target keyword is then associated with a state under a Markov chain model (such as a hidden Markov model (HMM) or a semi-Markov model (SMM)), a node of a recurrent neural network, or a combination thereof. The state information may include transition information from each of the states to a next state including itself. The keyword model parameters 424 also include a probability model for determining an observation score for an input sound. For example, the probability model may be any suitable model such as the GMM, the neural network, and the SVM. The threshold value 426 is a minimum confidence value for ensuring that an input sound includes a target keyword. The threshold value 426 may be determined to a suitable value such that a target keyword is not erroneously detected from an input sound which does not include the target keyword.

The Ack sound data 430 may be used in outputting an acknowledgement sound indicating a detection of the target keyword. If the Ack sound data 430 is audio data, the electronic device 140 may convert the audio data to generate and output an acknowledgment sound. On the other hand, if the Ack sound data 430 is a text string or one or more words rather than audio data, the electronic device 140 may generate and output an acknowledgement sound by converting the text string or words into speech based on the voice tone model 440 associated with the target keyword 422.

The voice tone model 440 is adapted to modify the voice tone of speech generated from text. The error check data 450 may be used in checking the data integrity of the keyword data file 400 and/or detecting accidental changes. For example, the error check data 450 may be a cyclic redundancy check (CRC) code.

Figure 5:
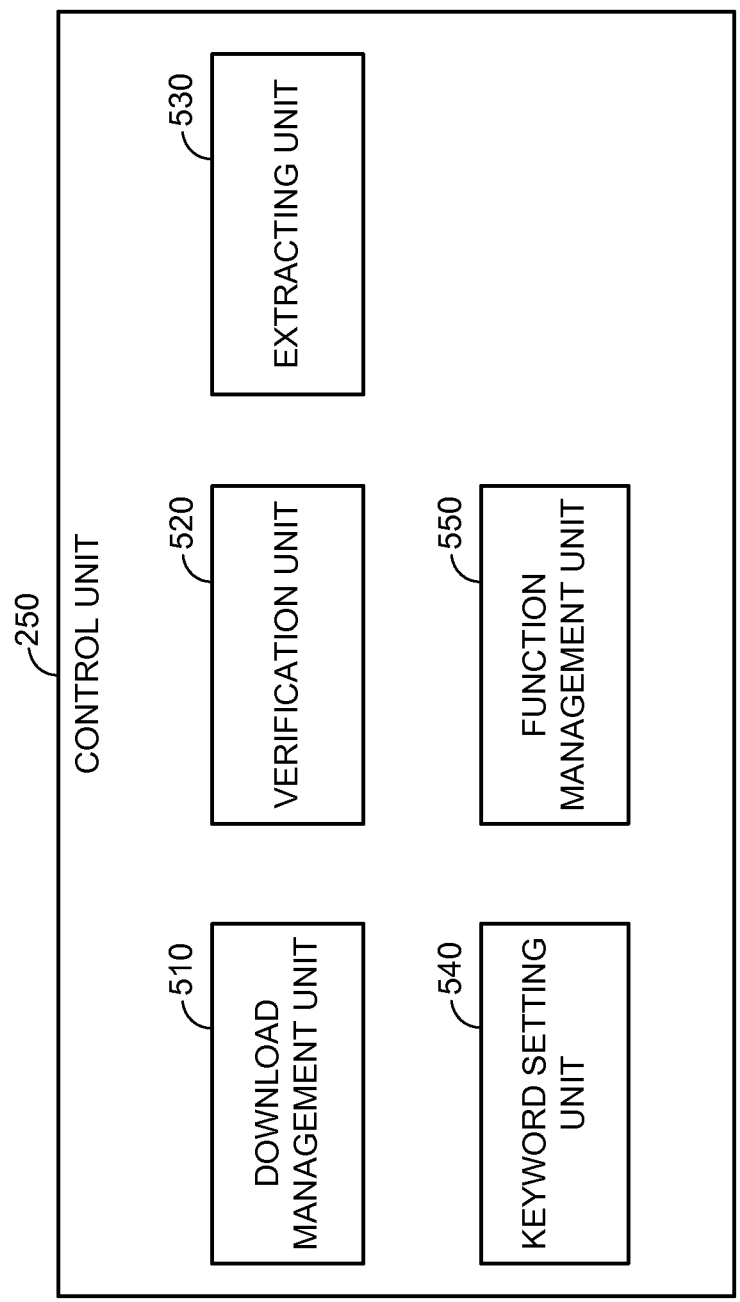
FIG. 5 illustrates a more detailed block diagram of the control unit in the electronic device that is configured to assign a target keyword to a selected function and to perform the selected function when the target keyword is detected, according to one embodiment of the present disclosure.

FIG. 5 illustrates a more detailed block diagram of the control unit 250 in the electronic device 140 that is configured to assign a target keyword to a selected function and perform the selected function when the target keyword is detected, according to one embodiment of the present disclosure. The control unit 250 includes a download management unit 510, a verification unit 520, an extracting unit 530, a keyword setting unit 540, and a function management unit 550. The download management unit 510 may be configured to download any type of files such as a text file, an audio file, a video file, a keyword data file, an application file, etc.

When the download management unit 510 downloads a keyword data file including a keyword model for use in detecting a target keyword, the verification unit 520 receives the keyword data file and verifies whether the keyword model can be used in the keyword detection unit 290 based on compatibility information or version information in the header of the downloaded keyword data file. The verification unit 520 may also check the data integrity of the downloaded keyword data file by decoding error check data of the downloaded keyword data file. If the verification unit 520 verifies that the downloaded keyword model is compatible with the keyword detection unit 290, the extracting unit 530 extracts the keyword model from the downloaded keyword data file and stores the extracted keyword model in the storage unit 240. In a particular embodiment, if the verification unit 520 determines that the keyword data file is not compatible with the keyword detection unit 290, the control unit 250 may attempt to convert the keyword model to version that is compatible with the keyword detection unit 290. In another particular embodiment, if the verification unit 520 determines that the keyword data file is not compatible with the keyword detection unit 290, the download management unit 510 may attempt to download another version of the keyword model. For example, the download management unit 510 may send a request for a second version of the keyword model to the server 110 of FIG. 1, where the second version of the keyword model is compatible with the keyword detection unit 290. In another example, the download management unit 510 may cause the communication unit 210 of FIG. 2 to send information related to the electronic device 140 to the server 110. The information related to the electronic device 140 may include, for example, a device type identifier, a model name identifier, a model type identifier, a keyword detection unit version identifier, other information, or a combination thereof. The server 110 may use the information related to the electronic device 140 to select and transmit a keyword model that is compatible with the keyword detection unit 290. The extracting unit 530 extracts the second version of the keyword model from a second downloaded keyword data file and stores the extracted second version of the keyword model in the storage unit 240. When the keyword data file also includes Ack sound data and a voice tone model, the extracting unit 530 extracts the Ack sound data and the voice tone model from the downloaded keyword data file and stores them in the storage unit 240.

The electronic device 140 may store a keyword-to-function database in the storage unit 240 that maps a plurality of target keywords to a plurality of functions. The keyword-to-function database may be provided in the electronic device 140 by a manufacturer or a carrier or created in response to a user input. The keyword setting unit 540 is configured to create a new keyword-to-function database or update an existing keyword-to-function database.

The keyword setting unit 540 allows a user to select a target keyword and a function in the electronic device 140 for performing the selected function when the selected target keyword is detected in an input sound. Upon selection of the target keyword and the function, the keyword setting unit 540 assigns the selected target keyword to the selected function. If an existing keyword-to-function database is not found, the keyword setting unit 540 generates a new keyword-to-function database that maps the selected target keyword to the selected function. On the other hand, if a keyword-to-function database already exists, the existing database is updated with the mapping of the selected target keyword and function. The keyword setting unit 540 may update the keyword-to-function database in response to additional selection of target keywords and functions or deletion of existing entries in the database.

The electronic device 140 may also store a keyword detection model including a plurality of keyword models for use in detecting target keywords associated with the plurality of keyword models in the storage unit 240 or the keyword detection unit 290. Upon assigning the selected target keyword to the function, the keyword setting unit 540 may retrieve the keyword model for the selected target keyword from the storage unit 240. If an existing keyword detection model is not found, the keyword setting unit 540 may send the retrieved keyword model to the storage unit 240 or the keyword detection unit 290 as a keyword detection model. On the other hand, if a keyword detection model already exists, the existing model is updated by adding the retrieved keyword model. For example, when a keyword detection model exists for a first target keyword, the user may download a keyword data file for a second target keyword. In this example, after the keyword data file is verified by the verification unit 520, the extracting unit 530 extracts a keyword model for the second target keyword from the keyword data file. The keyword setting unit 540 merges or combines (e.g., concatenates) the extracted keyword model for the second target keyword with the existing keyword detection model to form an updated keyword detection model (e.g., a combined keyword detection model for the first target keyword and the second target keyword). The keyword setting unit 540 provides the updated keyword detection model to the storage unit 240 or the keyword detection unit 290 for use in detecting the target keyword in the input sound stream. The keyword setting unit 540 may also update the keyword detection model in response to additional selection of target keywords and functions or deletion of existing entries in the keyword-to-function database.

When the keyword detection unit 290 detects a target keyword based on the keyword detection model, the keyword detection unit 290 generates a detection signal indicating a target keyword that has been detected. In response to the detection signal, the function management unit 550 accesses the keyword-to-function database to identify the function associated with the detected target keyword. The function management unit 550 then performs the identified function.

Additionally, the function management unit 550 may retrieve Ack sound data and a voice tone model associated with the detected target keyword from the storage unit 240. In this case, the function management unit 550 may generate and output an acknowledgement sound based on the retrieved Ack sound data to indicate detection of the target keyword. The function management unit 550 may also transmit the voice tone model to the TTS conversion unit 220 for modifying a voice tone of speech generated by the TTS conversion unit 220.

Figure 6:
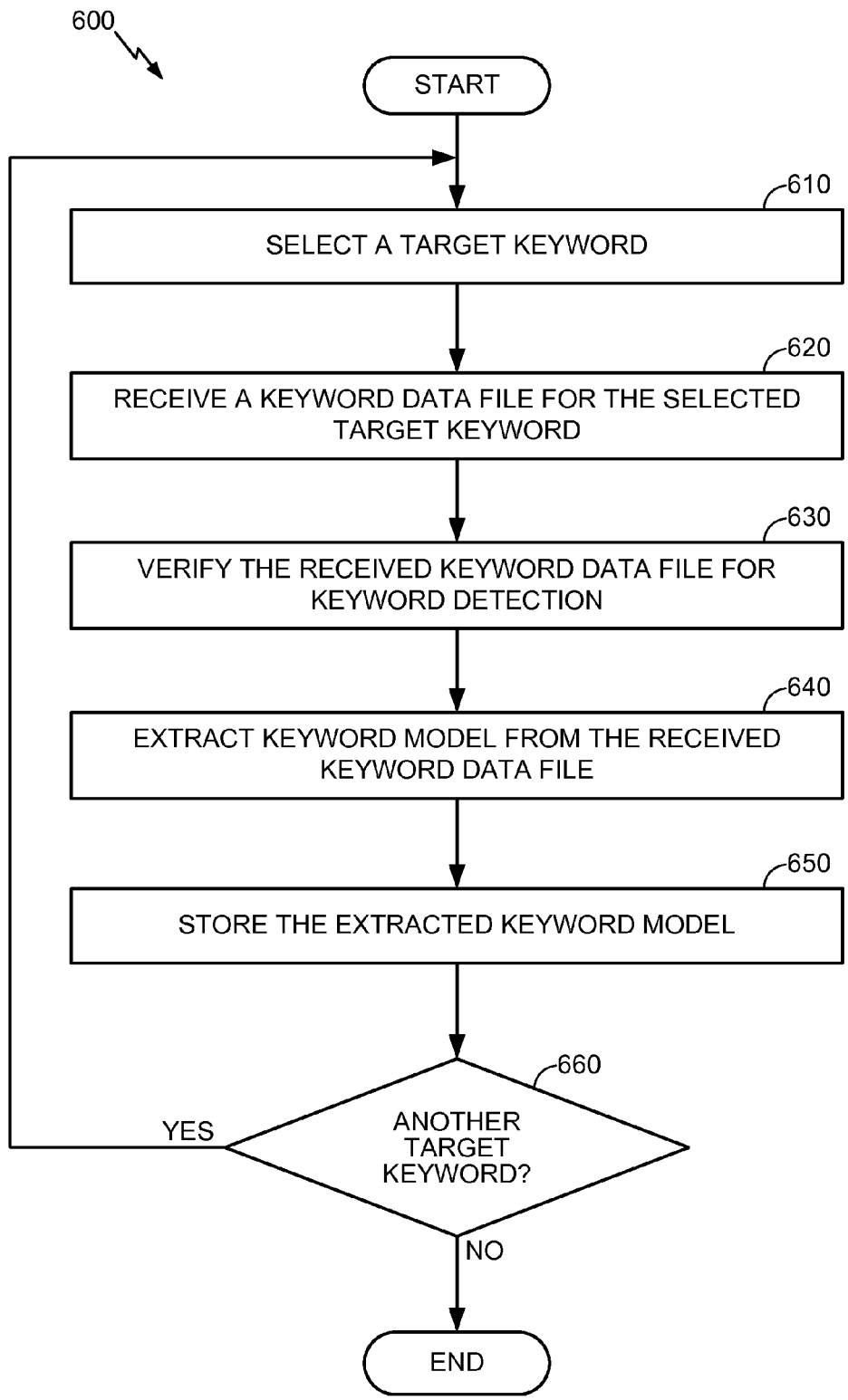
FIG. 6 illustrates a flowchart of an exemplary method performed in an electronic device for receiving a keyword model from a server for use in detecting a target keyword associated with the keyword model according to one embodiment of the present disclosure.

FIG. 6 illustrates a flowchart of an exemplary method 600 performed in the electronic device 140 for receiving a keyword model from the server 110 for use in detecting a target keyword associated with the keyword model according to one embodiment of the present disclosure. Initially, the electronic device 140 accesses a plurality of target keywords in the server 110 and a user on the electronic device 140 selects a target keyword from the plurality of target keywords, at 610. In response to the user's selection, the electronic device 140 receives a keyword data file for the selected target keyword from the server 110, at 620. The keyword data file includes a keyword model for use in detecting the selected target keyword. The keyword data file may also include Ack sound data and a voice tone model.

At 630, the electronic device 140 verifies the received keyword data file for keyword detection. In one embodiment, the electronic device 140 verifies whether the keyword model in the received keyword data file can be used in the keyword detection unit 290 based on compatibility information or version information in the header of the keyword data file. If the electronic device 140 verifies that the keyword model is compatible with the keyword detection unit 290, the electronic device 140 extracts the keyword model from the received keyword data file, at 640. If the electronic device 140 determines that the keyword model is not compatible with the keyword detection unit 290, the control unit 250 may attempt to convert the keyword model to a compatible version or the electronic device 140 may automatically download a different version of the keyword model that is compatible with the keyword detection unit 290. When the keyword data file also includes the Ack sound data and the voice tone model, the electronic device 140 also extracts the Ack sound data and the voice tone model from the received keyword data file.

Then, at 650, the electronic device 140 stores the extracted keyword model in the storage unit 240. If the Ack sound data and the voice tone model are also extracted from the received keyword data file, the electronic device 140 stores the extracted Ack sound data and voice tone model in the storage unit 240. If a keyword detection model related to another target keyword is already in use by the keyword detection unit 290, the electronic device 140 may merge or combine (e.g., concatenate) the extracted keyword model with the keyword detection model in use by the keyword detection unit 290 to form an updated keyword detection model (e.g., a combined keyword detection model for the selected target keyword and the other target keyword). The keyword setting unit 540 provides the updated keyword detection model to the storage unit 240 or the keyword detection unit 290 for use in detecting the target keyword or target keywords in the input sound stream. At 660, the method 600 determines whether another target keyword is to be selected. For example, the electronic device 140 may wait to receive an input from the user, which indicates whether the user would select another target keyword or not. If it is determined that another target keyword is to be selected, the method 600 proceeds back to 610 to select a next target keyword. Otherwise, the method 600 terminates.

Figure 7:
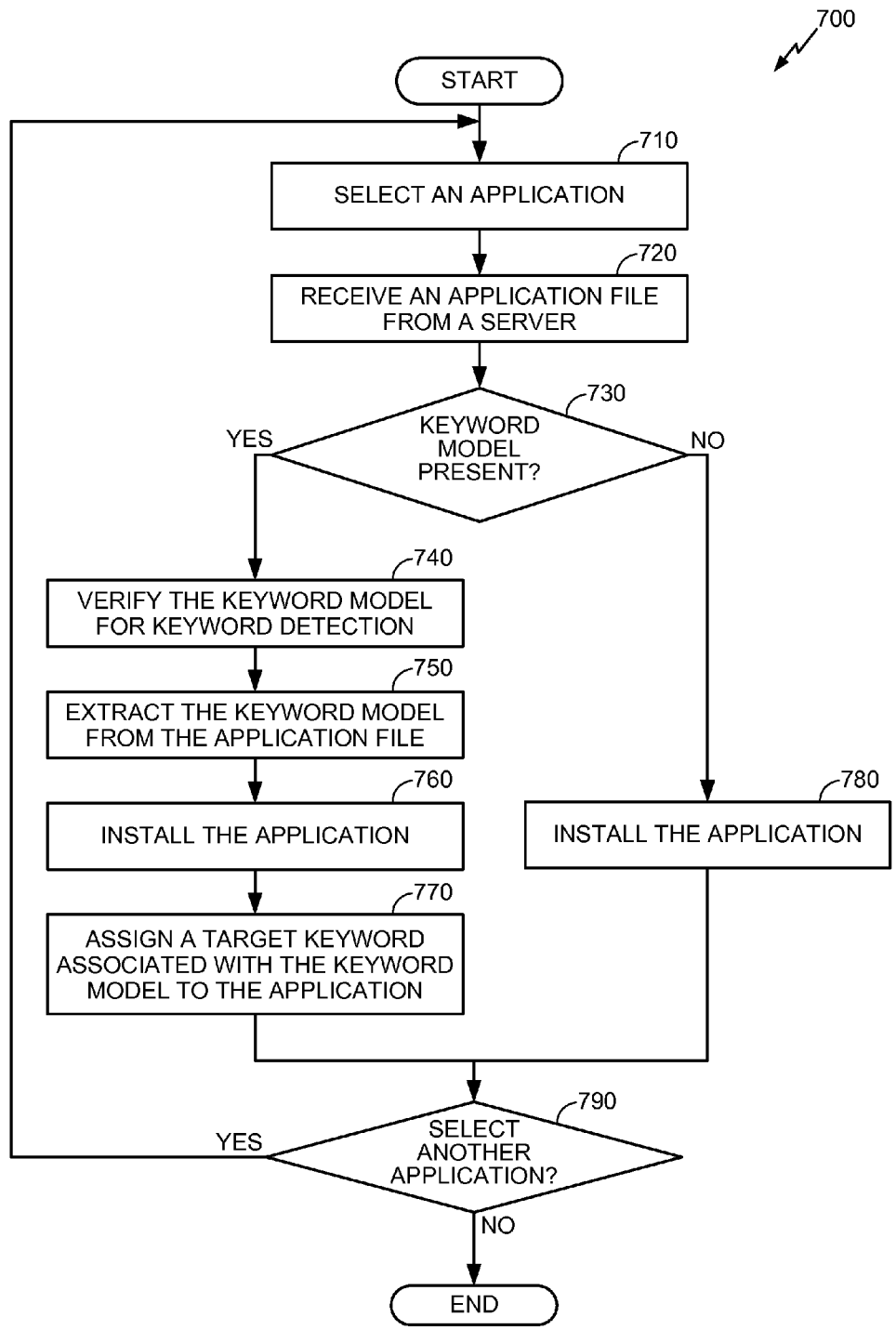
FIG. 7 illustrates a flowchart of an exemplary method performed in an electronic device for receiving an application file from a server and extracting a keyword model from the application file according to one embodiment of the present disclosure.

FIG. 7 illustrates a flowchart of an exemplary method 700 performed in the electronic device 140 for receiving an application file from the server 110 and extracting a keyword model from the application file according to one embodiment of the present disclosure. Initially, the electronic device 140 accesses a plurality of applications in the server 110 and a user on the electronic device 140 selects an application from the plurality of applications for download and installation, at 710. In response to the user's selection, the electronic device 140 receives an application file for installing the selected application, at 720. The application file may include a keyword model which may be used in detecting a target keyword and activating the application upon detection of the target keyword. In this case, the application file may also include Ack sound data and a voice tone model associated with the target keyword.

At 730, the method 700 determines whether a keyword model is present in the received application file. If it is determined that a keyword model is not present in the received application file, the application is installed in the electronic device 140, at 780. After installing the application, the method 700 proceeds to 790.

Otherwise, if it is determined that a keyword model is present in the received application file, the method 700 proceeds to 740 to verify the keyword model for keyword detection. In one embodiment, the electronic device 140 verifies whether the keyword model in the application file can be used in the keyword detection unit 290 for detecting a target keyword based on compatibility or version information in the header of the application file. If the electronic device 140 verifies that the keyword model is compatible with the keyword detection unit 290, the electronic device 140 extracts the keyword model from the received application file and stores the extracted keyword model in the storage unit 240, at 750. If the electronic device 140 determines that the keyword model is not compatible with the keyword detection unit 290, the electronic device 140 may automatically download a different version of the keyword model that is compatible with the keyword detection unit 290. When the application file also includes Ack sound data and a voice tone model, the Ack sound data and the voice tone model are extracted from the received application file and stored in the storage unit 240.

After extracting the keyword model, the application is installed in the electronic device 140 using the received application file, at 760. Then, at 770, the target keyword associated with the keyword model in the application file is assigned to the application for activating the installed application upon detection of the target keyword based on the keyword model. At 790, the method 700 determines whether another application is to be selected. If it is determined that another application is to be selected, the method 700 proceeds back to 710 to select another application. Otherwise, the method 700 terminates.

Figure 8:
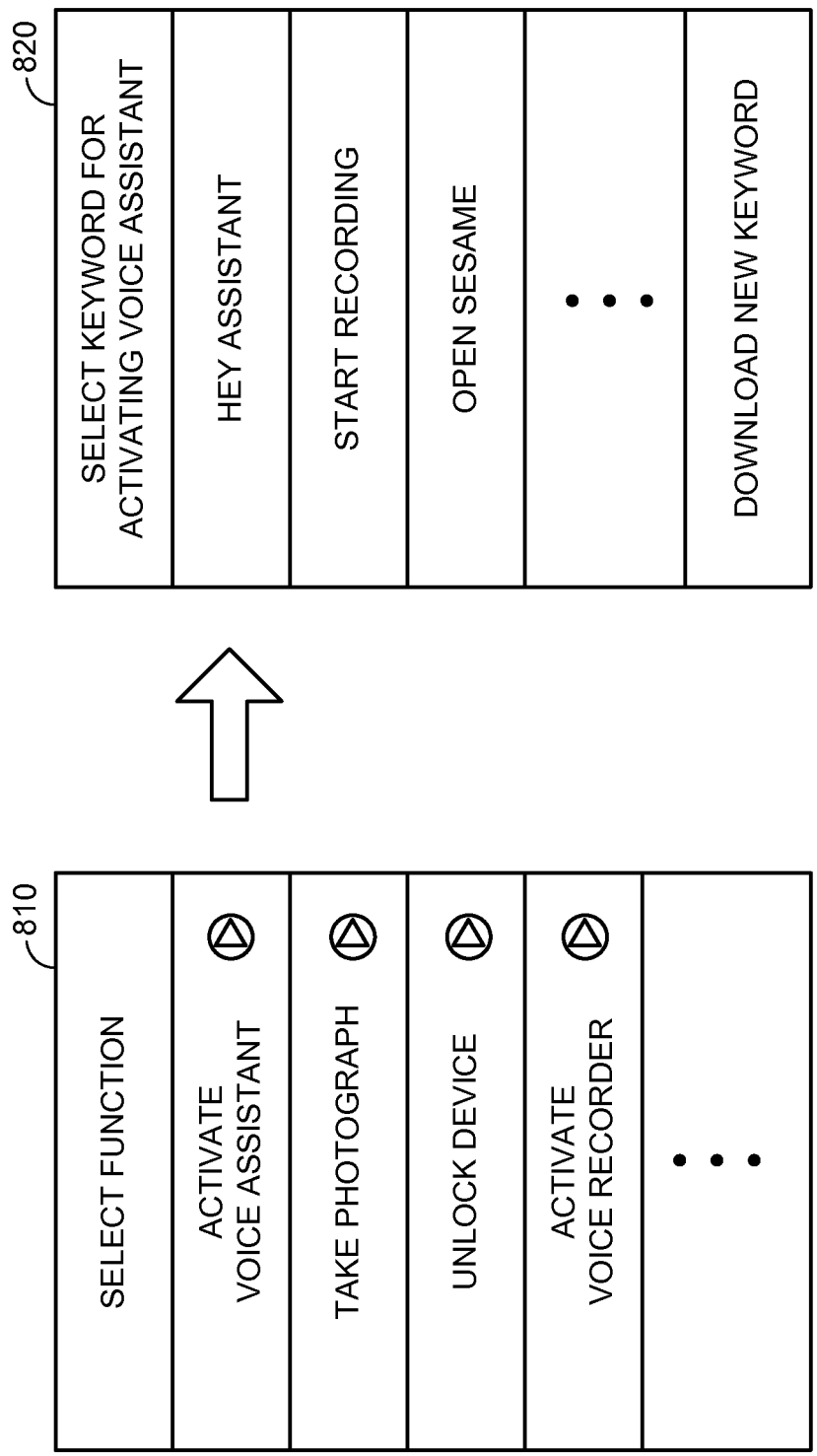
FIG. 8 illustrates a display screen in an electronic device showing menus for assigning a target keyword to a function according to one embodiment of the present disclosure.

FIG. 8 illustrates a display screen 310 in the electronic device 140 showing menus 810 and 820 for assigning a target keyword to a function according to one embodiment of the present disclosure. Initially, the menu 810 may be displayed on the display screen 310 for selecting a function from a list of a plurality of functions. As illustrated, the list of the plurality of functions includes activating a voice assistant application, taking a photograph, unlocking the electronic device 140, activating a voice recorder application, etc.

A user on the electronic device 140 may select a function from the menu 810. For example, the user may select the function "ACTIVATE VOICE ASSISTANT." In response, the electronic device 140 displays the menu 820 to allow the user to select a target keyword for performing the select function, i.e., activating the voice assistant application.

The menu 820 for selecting a target keyword displays a list of target keywords associated with keyword models stored in the electronic device 140. The user may select a target keyword from the menu 820 to assign the selected target keyword to the function "ACTIVATE VOICE ASSISTANT." For example, a target keyword "HEY ASSISTANT" may be assigned to the selected function, i.e., activating the voice assistant application. The menu 820 for selecting a target keyword may also provide a menu item for downloading a new target keyword. For example, the user may launch the keyword store illustrated in FIG. 3 by selecting the menu item "DOWNLOAD NEW KEYWORD" and download a new target keyword and an associated keyword model from the server 110.

When the target keyword "HEY ASSISTANT" is assigned to the function "ACTIVATE VOICE ASSISTANT," the electronic device 140 updates the keyword-to-function database by mapping the selected keyword "HEY ASSISTANT" to the selected function "ACTIVATE VOICE ASSISTANT." The electronic device 140 also retrieves a keyword model for the selected keyword "HEY ASSISTANT" and updates the keyword detection model by adding the retrieved keyword model. Based on the updated keyword detection model, the electronic device 140 may detect the target keyword "HEY ASSISTANT" in an input sound and activate the voice assistant application by accessing the updated keyword-to-function database.

Figure 9:
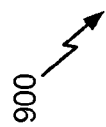
FIG. 9 is an exemplary keyword-to-function database that maps a plurality of target keywords to a plurality of functions according to one embodiment of the present disclosure.

FIG. 9 is an exemplary keyword-to-function database 900 that maps a plurality of target keywords to a plurality of functions according to one embodiment of the present disclosure. In the illustrated embodiment, target keywords "SAY CHEESE," "OPEN SESAME," "HEY ASSISTANT," and "START RECORDING" are mapped to functions "TAKE PHOTOGRAPH," "UNLOCK DEVICE," "ACTIVATE VOICE ASSISTANT," and "ACTIVATE VOICE RECORDER," respectively. The keyword-to-function database 900 may also map the target keywords (e.g., "SAY CHEESE") to associated Ack sound data (e.g., a beep sound) and voice tone models (e.g., a robotic voice). The keyword-to-function database 900 may be implemented as a lookup table or any other data structure that associates a plurality of target keywords with a plurality of functions.

As described above with reference to FIG. 5, when the electronic device 140 detects a target keyword (e.g., "SAY CHEESE") based on its keyword model, the electronic device 140 accesses the keyword-to-function database 900 to identify a function (e.g., taking a photograph) associated with the detected target keyword. The electronic device 140 then performs the identified function (e.g., taking a photograph). Additionally, the electronic device 140 may retrieve Ack sound data (e.g., a beep sound) and a voice tone model (e.g., a robotic voice), which are associated with the detected target keyword (e.g., "SAY CHEESE") in the keyword-to-function database 900, from the storage unit 240.

Upon retrieving the Ack sound data, the electronic device 140 may convert the retrieved Ack sound data (e.g., a beep sound) to generate and output an acknowledgement sound indicating that the target keyword (e.g., "SAY CHEESE") has been detected. If the Ack sound data is a text string or one or more words rather than audio data, the electronic device 140 may generate and output an acknowledgement sound by converting the text string or words into speech based on a voice tone model associated with the target keyword. For example, when the electronic device 140 detects the target keyword "HEY ASSISTANT," it performs the function "ACTIVATE VOICE ASSISTANT" and generates an acknowledgement sound "MAY I HELP YOU?" in a voice tone of "FEMALE VOICE 2."

The electronic device 140 may also transmit a voice tone model (e.g., robotic voice) associated with the target keyword to the TTS conversion unit 220 for modifying a voice tone of speech generated by the TTS conversion unit 220. Once the voice tone model has been set, the TTS conversion unit 220 performs text-to-speech conversion based on the voice tone model associated with the detected target keyword. For example, after detecting the target keyword "SAY CHEESE," the electronic device 140 may determine that lighting is insufficient for taking a photograph. In this case, the electronic device 140 may perform text-to-speech conversion based on the voice tone model "ROBOTIC VOICE" to generate an audio message such as "insufficient light."

Figure 10A:
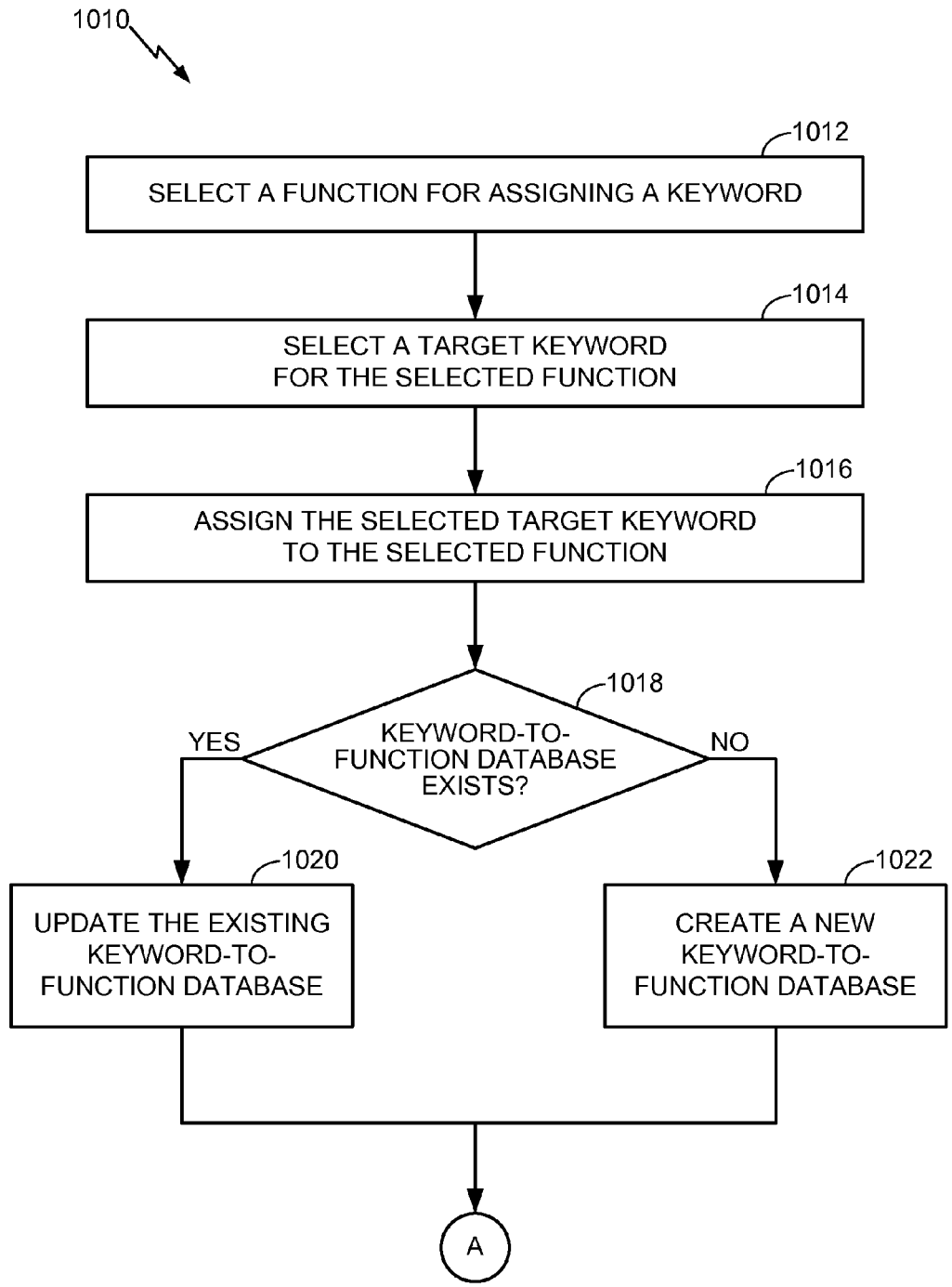
FIG. 10A illustrates a flowchart of an exemplary method, performed in an electronic device, for assigning a target keyword to a function and updating a keyword-to-function database according to one embodiment of the present disclosure.

FIG. 10A illustrates a flowchart of an exemplary method 1010, performed in the electronic device 140, for assigning a target keyword to a function and updating a keyword-to-function database according to one embodiment of the present disclosure. Initially, a user of the electronic device 140 selects a function from a list of a plurality of functions for assigning a target keyword, at 1012. Then, the user selects a target keyword for the selected function to assign the selected target keyword to the selected function, at 1014. Selecting the function and the target keyword may be performed in the manner as described above with reference to FIG. 8.

In response, the electronic device 140 assigns the selected target keyword to the selected function, at 1016. When the target keyword is assigned to the function, the method 1010 determines whether a keyword-to-function database exists. If it is determined that a keyword-to-function database already exists, the method 1010 proceeds to 1020 to update the existing database with the mapping of the selected target keyword and the selected function. On the other hand, if an existing keyword-to-function database is not found, the method 1010 proceeds to 1022 to create a new keyword-to-function database that maps the selected target keyword to the selected function. After updating or creating the keyword-to-function database the method 1010 proceeds to 1032 in FIG. 10B to retrieve a keyword model for the selected target keyword, which will be described in detail below.

Figure 10B:
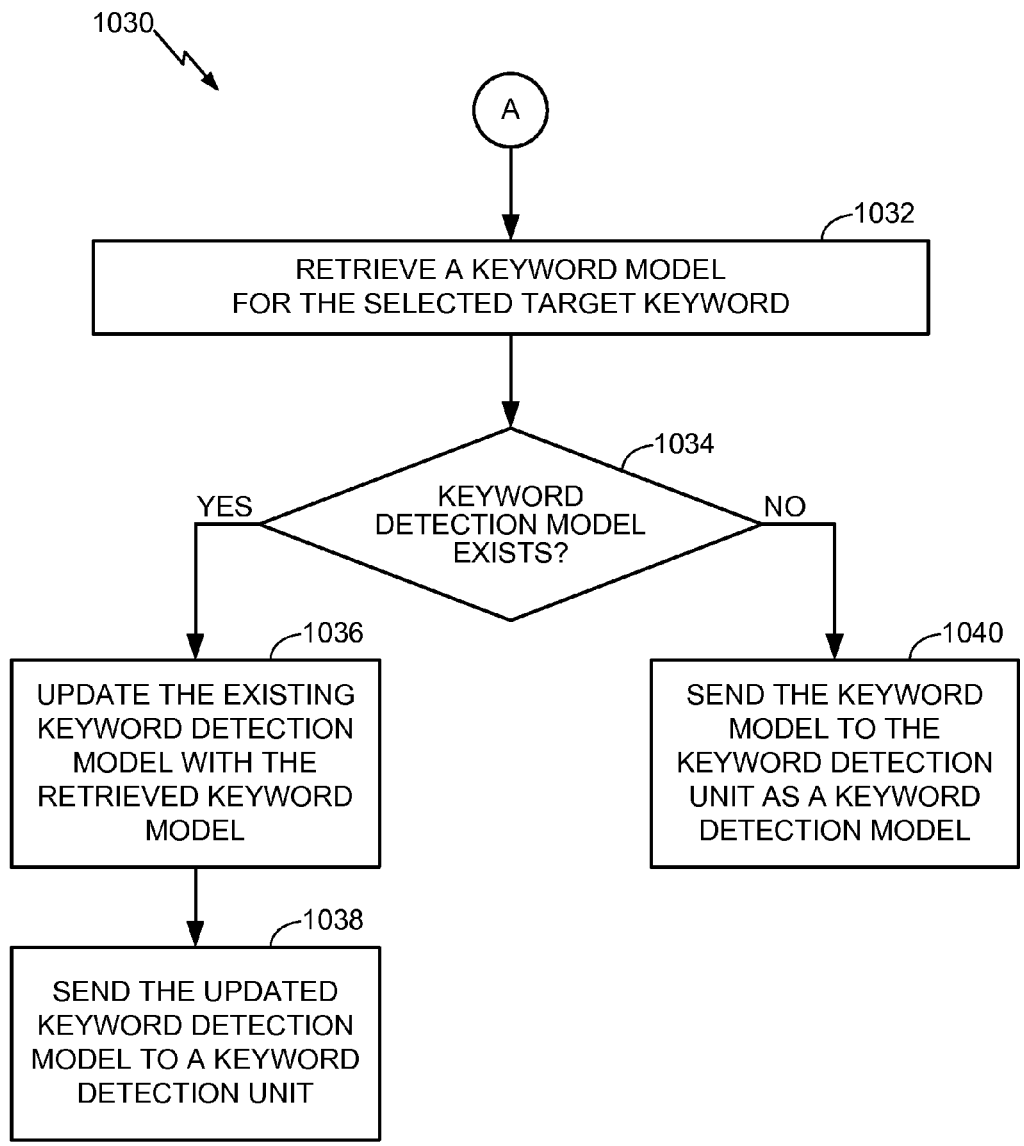
FIG. 10B illustrates a flowchart of an exemplary method, performed in the electronic device, for assigning the target keyword to the function and updating a keyword detection model, according to one embodiment of the present disclosure.

FIG. 10B illustrates a flowchart of an exemplary method 1030, performed in the electronic device 140, for assigning the target keyword to the function and updating a keyword detection model, according to one embodiment of the present disclosure. Initially, after updating or creating the keyword-to-function database in the method 1010 of FIG. 10A, the electronic device 140 retrieves a keyword model for the selected target keyword from the storage unit 240, at 1032. The retrieved keyword model may include a target keyword, keyword model parameters, and a threshold value.

When the keyword model is retrieved, the method 1030 determines whether a keyword detection model already exists (e.g., whether the keyword detection unit 290 is already using a keyword detection model), at 1034. If an existing keyword detection model is not found, the method 1030 proceeds to 1040 to send the retrieved keyword model to the keyword detection unit 290 as a keyword detection model. On the other hand, if it is determined that a keyword detection model already exists, the method 1030 proceeds to 1036 to update the existing keyword detection model. For example, the electronic device 140 may update the keyword detection model by adding the retrieved keyword model to the existing keyword detection model (e.g., by merging the retrieved keyword model and the keyword detection model to form a combined keyword detection model). Then, the electronic device 140 sends the updated keyword detection model to the keyword detection unit 290, at 1038, for use in detecting the selected target keyword.

Figure 11:
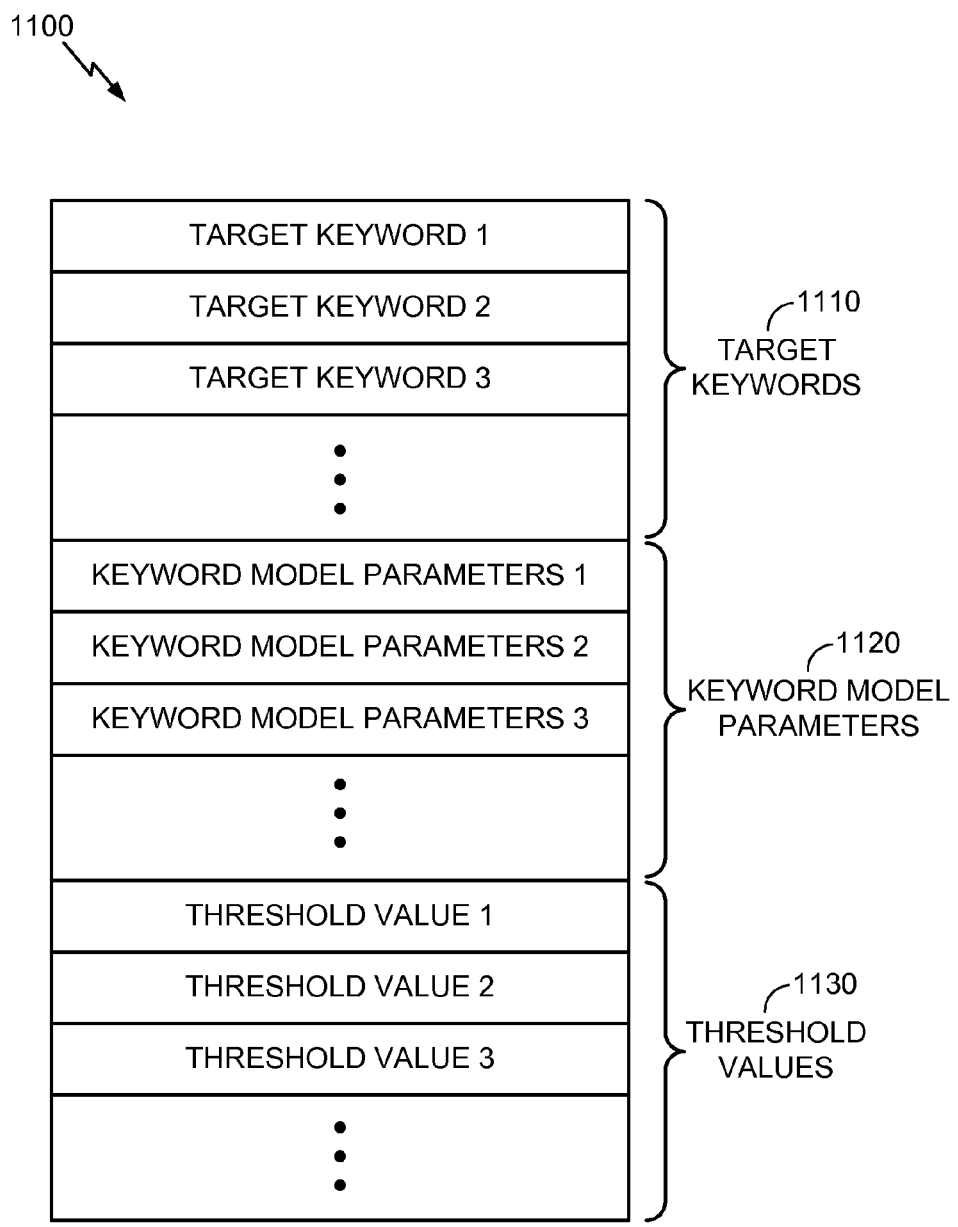
FIG. 11 shows an exemplary keyword detection model including a plurality of keyword models according to one embodiment of the present disclosure.

FIG. 11 shows an exemplary keyword detection model 1100 including a plurality of keyword models according to one embodiment of the present disclosure. The keyword detection model 1100 includes target keywords 1110, keyword model parameters 1120, and threshold values 1130 for the keyword models. In the illustrated embodiment, the target keywords 1110, the keyword model parameters 1120, and the threshold values 1130 are arranged separately in the keyword detection model 1100 according to their categories. When a new target keyword is assigned to another function, a keyword model associated with the new target keyword may be combined with the keyword models in the keyword detection model 1100.

As described with reference to FIG. 5 above, the keyword detection unit 290 may be configured to detect the target keywords 1110 in an input sound based on the keyword detection model 1100. When the keyword detection unit 290 detects one of the target keywords 1110, it generates a detection signal indicating the target keyword that has been detected and transmits the detection signal to the control unit 250. In response to the detection signal, the control unit 250 performs a function associated with the detected target keyword by accessing a keyword-to-function database. Although the keyword detection model 1100 in FIG. 11 includes target keywords 1110, keyword model parameters 1120, and threshold values 1130, it may include the target keywords 1110 as an optional item.

Figure 12:
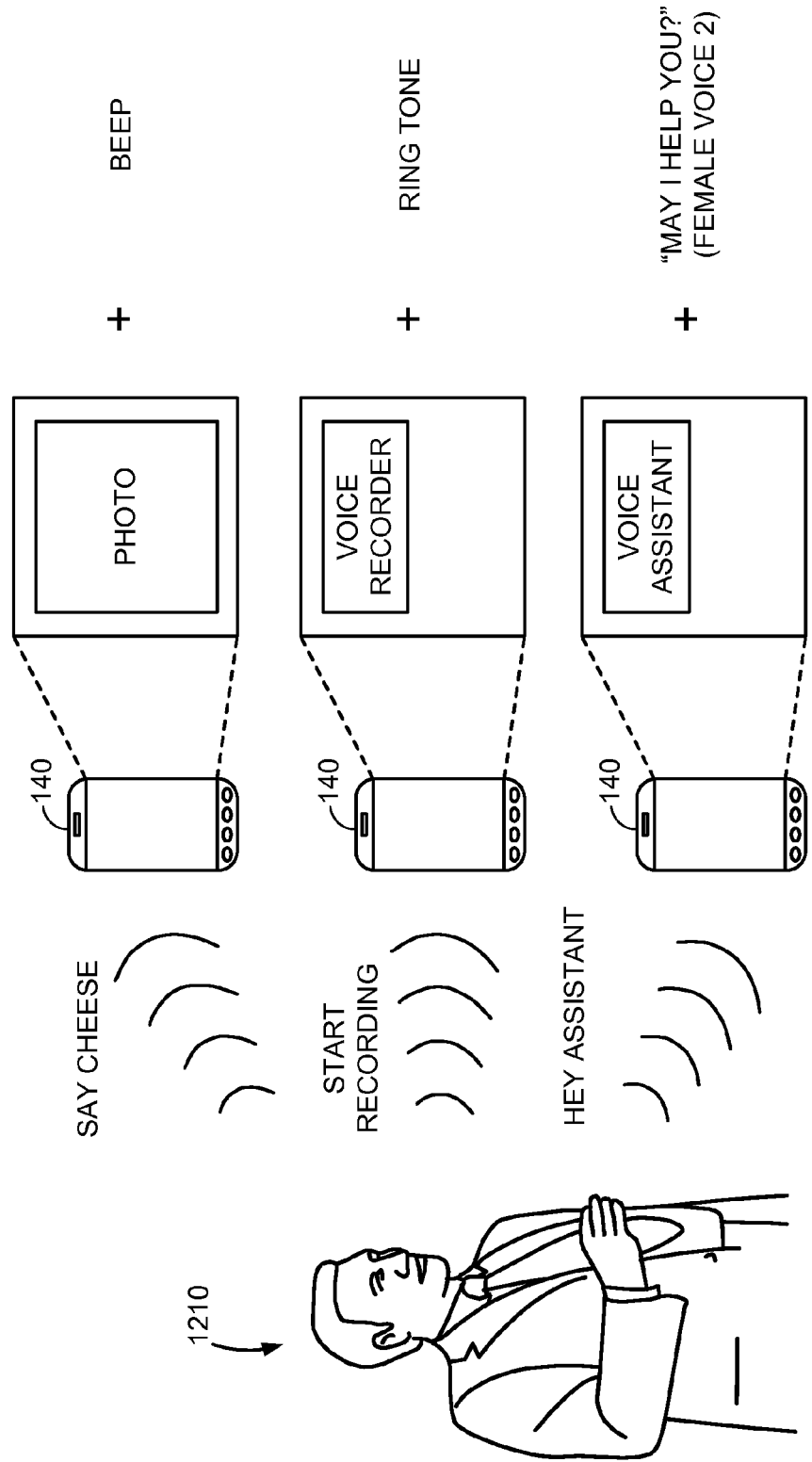
FIG. 12 illustrates an electronic device that is configured to perform a plurality of functions in response to detecting associated target keywords in an input sound according to one embodiment of the present disclosure.

FIG. 12 illustrates the electronic device 140 that is configured to perform a plurality of functions in response to detecting associated target keywords in an input sound according to one embodiment of the present disclosure. In the illustrated embodiment, a user 1210 speaks three different target keywords, "SAY CHEESE," "START RECORDING," and "HEY ASSISTANT" to the electronic device 140 at different times. In response to the input sounds, the electronic device 140 may detect the target keywords based on the keyword detection model 1100. In case the target keyword "SAY CHEESE" is detected, the electronic device 140 accesses the keyword-to-function database 900 and performs the associated function of taking a photograph. In addition, the electronic device 140 may generate and output a beep sound based on Ack sound data associated with the target keyword "SAY CHEESE."

Similarly, when the target keyword "START RECORDING" is detected, the electronic device 140 performs the associated function of activating the voice recorder application based on the keyword-to-function database 900. The electronic device 140 may also generate and output a ring tone based on Ack sound data associated with the target keyword "START RECORDING." In case the target keyword "HEY ASSISTANT" is detected, the electronic device 140 accesses the keyword-to-function database 900 and performs the associated function of activating the voice assistant application. In addition, the electronic device 140 generates and outputs an acknowledgement sound "MAY I HELP YOU?" in a voice tone of "FEMALE VOICE 2" by using Ack sound data and a voice tone model associated with the target keyword "HEY ASSISTANT."

Figure 13:
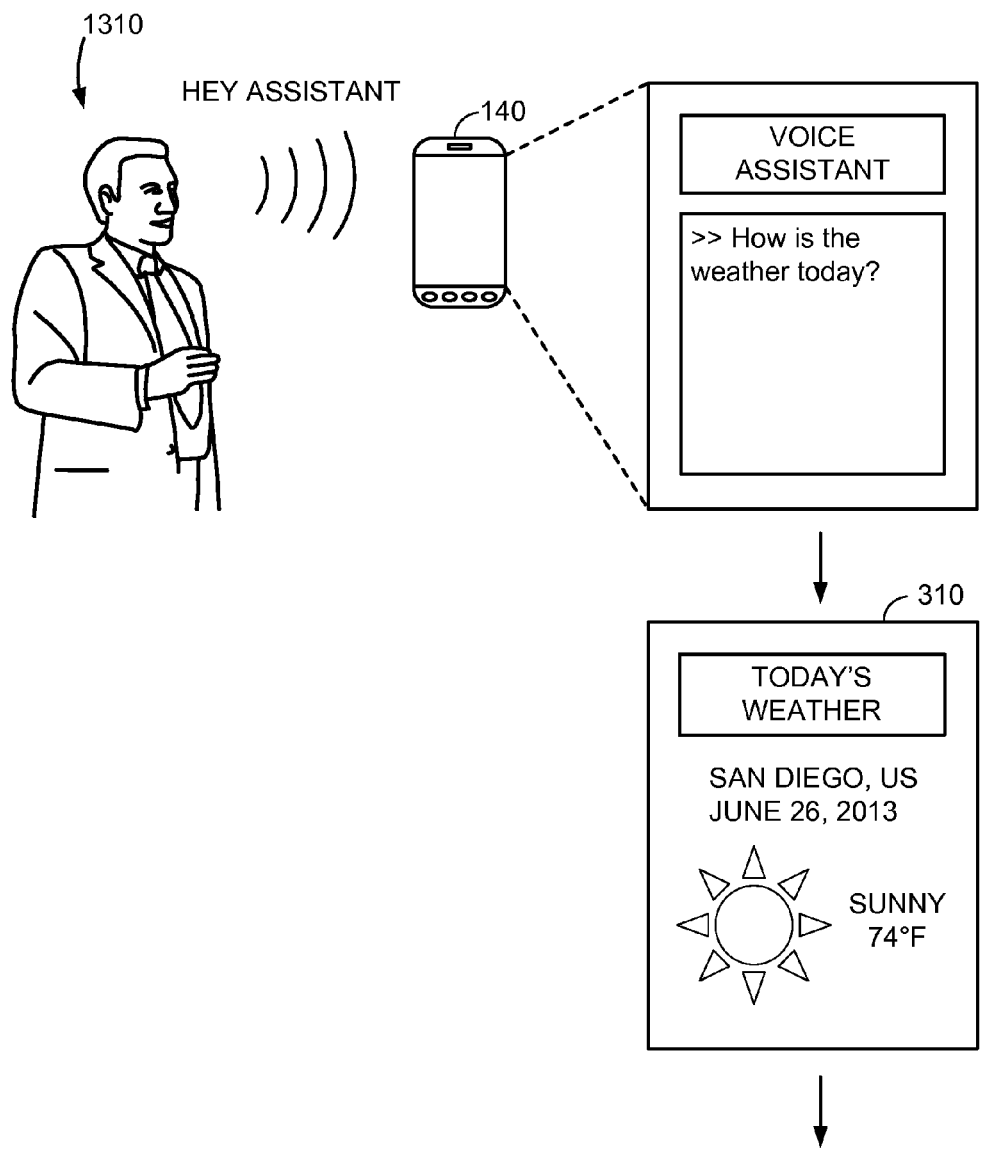
FIG. 13 illustrates an electronic device configured to generate speech data from text based on a voice tone model associated with a target keyword according to one embodiment of the present disclosure.

FIG. 13 illustrates the electronic device 140 configured to generate speech data from text based on a voice tone model associated with a target keyword according to one embodiment of the present disclosure. As described with reference to FIG. 12 above, when the target keyword "HEY ASSISTANT" is detected, the electronic device activates the voice assistant application associated with the target keyword and outputs the acknowledgement sound "MAY I HELP YOU?" in the voice tone of "FEMALE VOICE 2." In response, a user 1310 may perform various operations through the voice assistant application by speaking voice commands.

In the illustrated embodiment, the user 1310 may ask for a weather forecast by speaking a voice command "How is the weather today?" The electronic device 140 may then access weather information through the communication network 150 based on GPS (Global Positioning System) information of the electronic device 140, and display received weather information on the display screen 310. In addition, the electronic device 140 may also output the weather information by converting a text message "It's sunny in San Diego and the temperature is 74 degrees" to speech with the voice tone "FEMALE VOICE 2" associated with the target keyword "HEY ASSISTANT."

Figure 14:
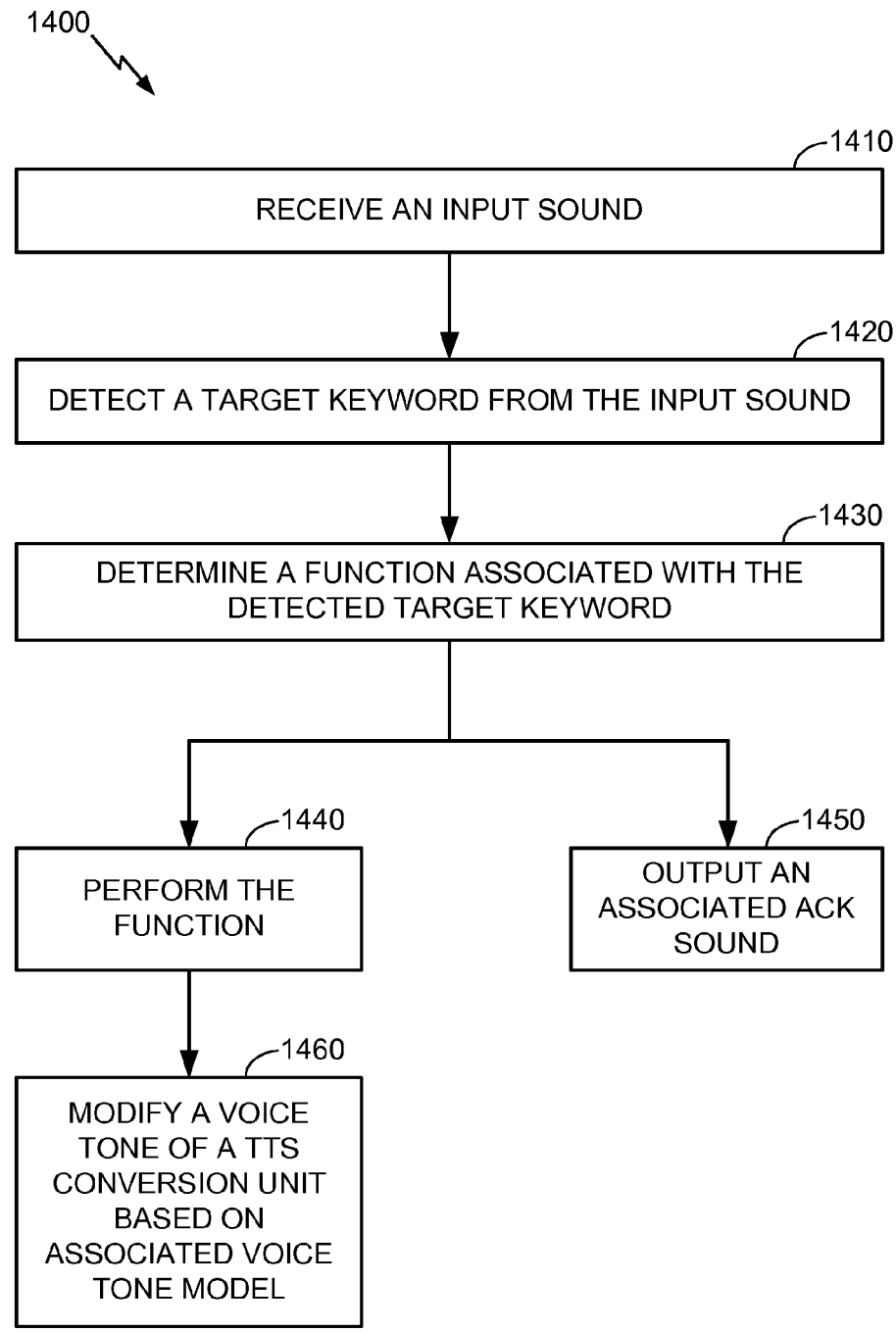
FIG. 14 illustrates a flowchart of an exemplary method, performed in an electronic device, for performing a function associated with a target keyword detected in an input sound according to one embodiment of the present disclosure.

FIG. 14 illustrates a flowchart of an exemplary method 1400, performed in the electronic device 140, for performing a function associated with a target keyword detected in an input sound according to one embodiment of the present disclosure. Initially, the electronic device 140 receives an input sound by the sound sensor 270, at 1410. Then, the electronic device 140 detects a target keyword from the input sound based on a keyword detection model, at 1420.

Upon detection of the target keyword, the electronic device 140 accesses a keyword-to-function database to identify the function associated with the detected target keyword, at 1430. By accessing the keyword-to-function database, the electronic device 140 may also identify Ack sound data and a voice tone model associated with the detected target keyword. The method 1400 then proceeds to 1440 to perform the function associated with the detected target keyword. In addition, an acknowledgement sound is output based on the Ack sound data associated with the detected target keyword, at 1450. After performing the function, the electronic device 140 modifies a voice tone of the TTS conversion unit 220 based on the identified voice tone model, at 1460.

Figure 15:
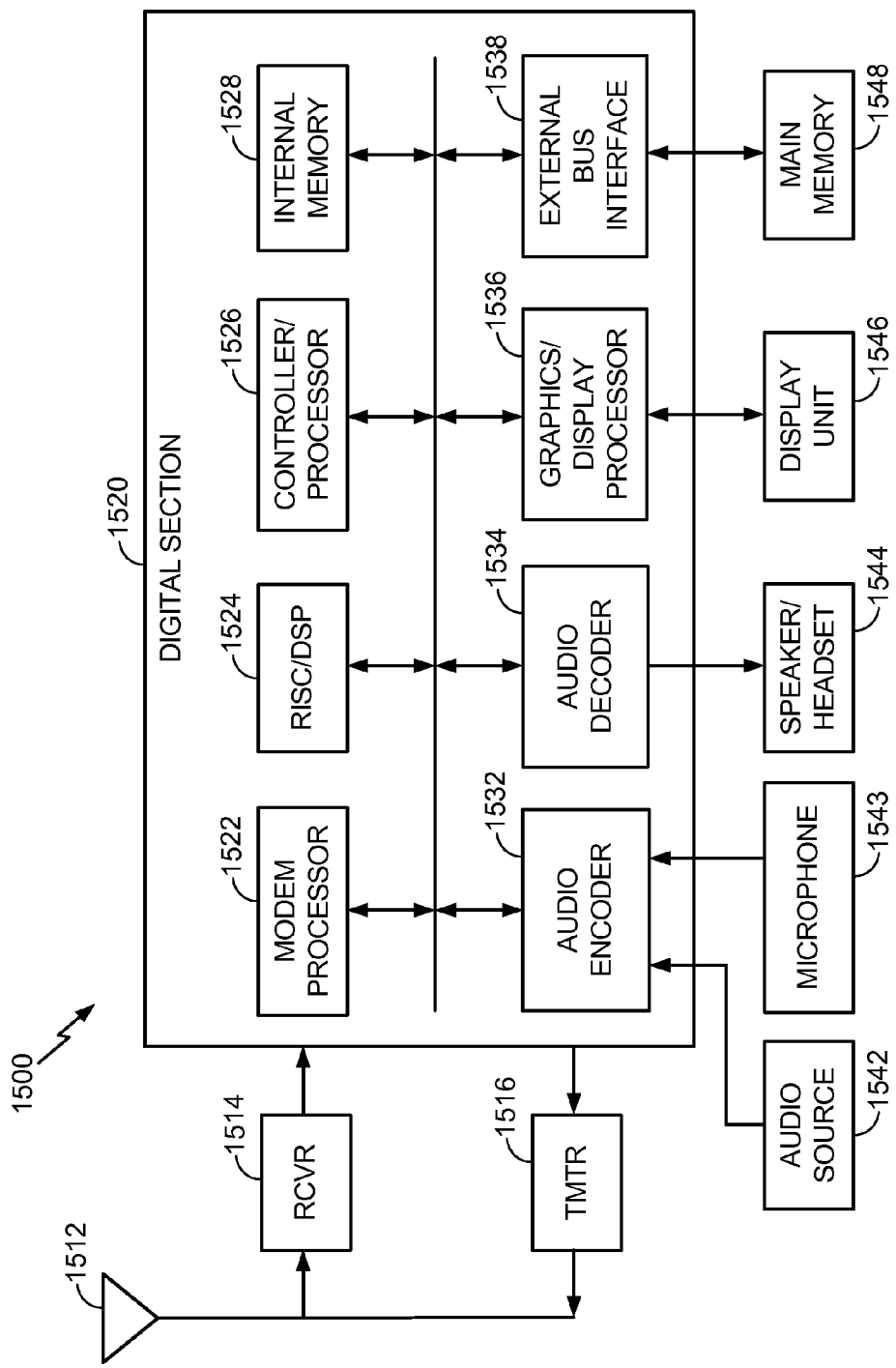
FIG. 15 illustrates a block diagram of a mobile device in a wireless communication system in which methods and apparatus for setting a target keyword for operating a function may be implemented according to some embodiments of the present disclosure.

FIG. 15 illustrates a block diagram of a mobile device 1500 in a wireless communication system in which methods and apparatus for setting a target keyword for operating a function may be implemented according to some embodiments of the present disclosure. The mobile device 1500 may be a cellular phone, a terminal, a handset, a personal digital assistant (PDA), a wireless modem, a cordless phone, a tablet, and so on. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, and so on.

The mobile device 1500 may be capable of providing bidirectional communication via a receive path and a transmit path. On the receive path, signals transmitted by base stations are received by an antenna 1512 and are provided to a receiver (RCVR) 1514. The receiver 1514 conditions and digitizes the received signal and provides the conditioned and digitized signal to a digital section 1520 for further processing. On the transmit path, a transmitter (TMTR) receives data to be transmitted from the digital section 1520, processes and conditions the data, and generates a modulated signal, which is transmitted via the antenna 1512 to the base stations. The receiver 1514 and the transmitter 1516 are part of a transceiver that supports CDMA, GSM, W-CDMA, LTE, LTE Advanced, and so on.

The digital section 1520 includes various processing, interface, and memory units such as, for example, a modem processor 1522, a reduced instruction set computer/digital signal processor (RISC/DSP) 1524, a controller/processor 1526, an internal memory 1528, a generalized audio encoder 1532, a generalized audio decoder 1534, a graphics/display processor 1536, and/or an external bus interface (EBI) 1538. The modem processor 1522 performs processing for data transmission and reception, e.g., encoding, modulation, demodulation, and decoding. The RISC/DSP 1524 performs general and specialized processing for the mobile device 1500. The controller/processor 1526 controls the operation of various processing and interface units within the digital section 1520. The internal memory 1528 stores data and/or instructions for various units within the digital section 1520.

The generalized audio encoder 1532 performs encoding for input signals from an audio source 1542, a microphone 1543, and so on. The generalized audio decoder 1534 performs decoding for coded audio data and provides output signals to a speaker/headset 1544. It should be noted that the generalized audio encoder 1532 and the generalized audio decoder 1534 are not necessarily required for interface with the audio source, the microphone 1543 and the speaker/headset 1544, and thus are not shown in the mobile device 1500. The graphics/display processor 1536 performs processing for graphics, videos, images, and texts, which is presented to a display unit 1546. The EBI 1538 facilitates transfer of data between the digital section 1520 and a main memory 1548.

The digital section 1520 is implemented with one or more processors, DSPs, microprocessors, RISCs, etc. The digital section 1520 is also fabricated on one or more application specific integrated circuits (ASICs) and/or some other type of integrated circuits (ICs).

In general, any device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

Figure 16:
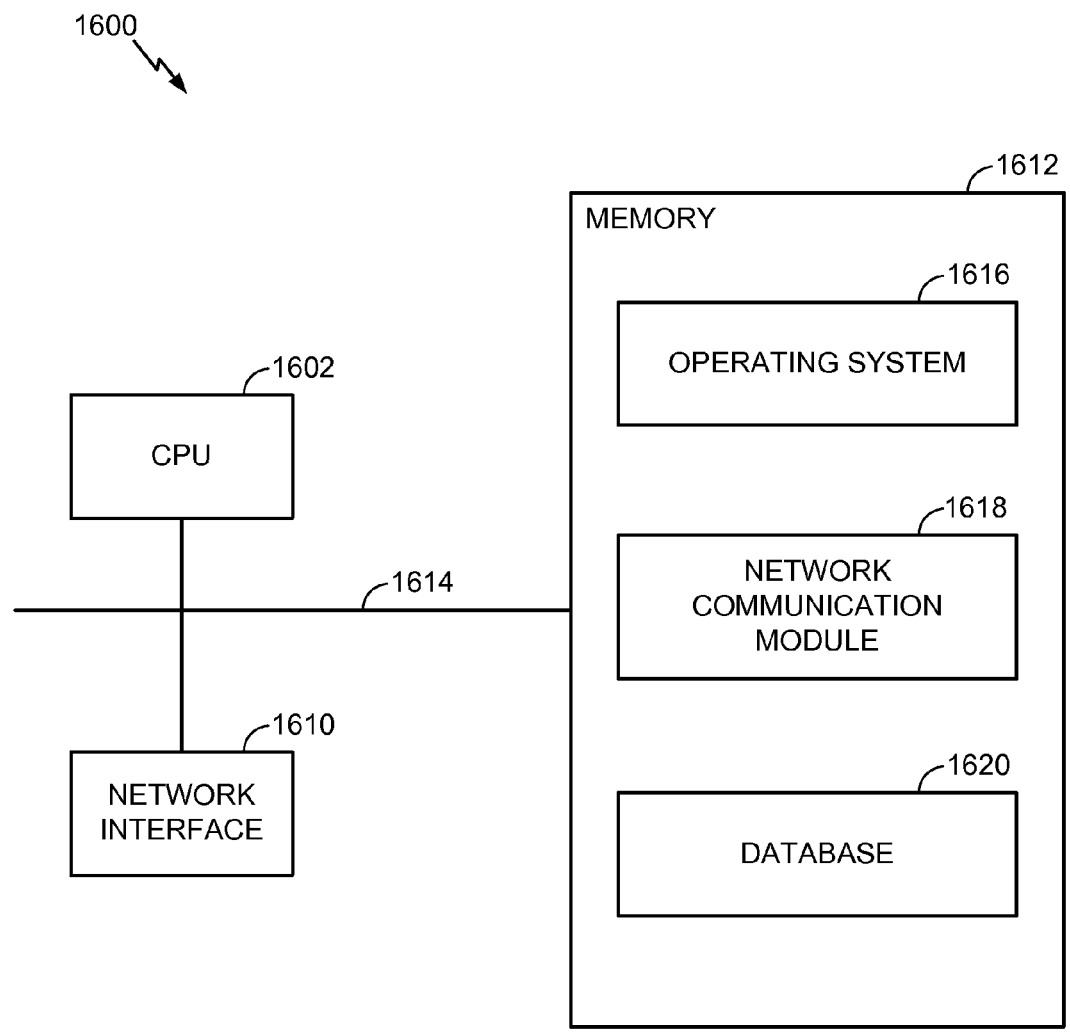
FIG. 16 illustrates a block diagram of a server system in which methods and apparatus for providing keyword models for detecting associated target keywords may be implemented in accordance with some embodiments of the present disclosure.

FIG. 16 illustrates a block diagram of a server system 1600 in which methods and apparatus for providing keyword models for detecting associated target keywords may be implemented in accordance with some embodiments of the present disclosure. The server system 1600 may include one or more processing units (CPUs) 1602, one or more network or other communication network interfaces 1610, a memory 1612, and one or more communication buses 1614 for interconnecting these components. The server system 1600 may also include a user interface (not shown) having a display device and a keyboard.

The memory 1612 may be any suitable memory, such as a high-speed random access memory, (e.g., DRAM, SRAM, DDR RAM or other random access solid state memory devices). The memory 1612 may include or may alternatively be non-volatile memory (e.g., one or more magnetic disk storage devices, optical disk storage devices, flash memory devices, or other non-volatile solid state storage devices). In some embodiments, the memory 1612 may include one or more storage devices remotely located from the CPU(s) 1602 and/or remotely located in multiple sites.

Any one of the above memory devices represented by the memory 1612 may store any number of modules or programs that corresponds to a set of instructions for performing and/or executing any of the processes, operations, and methods previously described. For example, the memory 1612 may include an operating system 1616 configured to store instructions that include procedures for handling various basic system services and for performing hardware dependent tasks. A network communication module 1618 of the memory 1612 may be used for connecting the server system 1600 to other computers via the one or more communication network interfaces 1610 (wired or wireless) and one or more communication networks, such as the Internet, other wide area networks, local area networks, metropolitan area networks, and so on.

The memory 1612 may also include a database 1620 which is configured to store various data and/or information necessary for operations of the server system 1600. For example, the database 1620 stores keyword data files for a plurality of target keywords. In this configuration, each of the keyword data files may include a keyword model, Ack sound data, and a voice tone model.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 1612 may store additional modules and data structures not described above.

FIGS. 15 and 16 are intended more as functional descriptions of the various features of a client system and server system rather than a structural schematic of the embodiments described herein. In practice, and as recognized by those of ordinary skill in the art, items shown separately could be combined and some items could be separated. For example, some items shown separately in FIG. 16 could be implemented on a single server and single items could be implemented by one or more servers. Furthermore, the database 1620 may be implemented on a different set of servers or in other components of the server system 1600. The actual number of servers used to implement the server system 1600, and the allocation of features among them may vary from one implementation to another.

The techniques described herein are implemented by various means. For example, these techniques are implemented in hardware, firmware, software, or a combination thereof. It will be further appreciated that the various illustrative logical blocks, modules, circuits, and algorithm steps described in connection with the disclosure herein may be implemented as electronic hardware, computer software, or combinations of both are possible. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

If implemented in software, the methods, operations, and processes previously described may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving, at an electronic device, a list of a plurality of target keywords, the list received via a communication network;
    receiving, at the electronic device, user input that selects a particular target keyword from the list of the plurality of target keywords; and
    in response to the user input:
        receiving a keyword data file at the electronic device via the communication network, the keyword data file including a keyword model for the particular target keyword and including compatibility information;
        determining whether the keyword data file is compatible with a keyword detection unit of the electronic device based on the compatibility information;
        receiving a second version of the keyword model based on a determination that the keyword data file is not compatible with the keyword detection unit; and
        assigning, at the electronic device, the particular target keyword to a function of the electronic device such that the function is activated in response to detecting, based on the keyword model, that an input sound received at the electronic device includes the particular target keyword.

2. The method of claim 1, further comprising:
    receiving response sound data at the electronic device;
    detecting whether the particular target keyword is included in the input sound; and, in response to detecting that the particular target keyword is included in the input sound, outputting a response sound at the electronic device based on the response sound data.

3. The method of claim 1, further comprising,
in response to a determination that the keyword data file is compatible with the keyword detection unit, extracting the keyword model from the keyword data file and storing the keyword model.

4. The method of claim 1, wherein the second version of the keyword model is compatible with the keyword detection unit and further comprising storing the second version of the keyword model.

5. The method of claim 1, further comprising, in response to a determination that the keyword data file is not compatible with the keyword detection unit:
sending information descriptive of the electronic device, the keyword detection unit, or both, via the communication network to a server, wherein the server selects the second version of the keyword model based on the information, wherein the second version of the keyword model is compatible with the keyword detection unit;
receiving the second version of the keyword model from the server; and
storing the second version of the keyword model at the electronic device.

6. The method of claim 1, further comprising, in response to a determination that the keyword data file is not compatible with the keyword detection unit, converting the keyword model to the second version, wherein the second version of the keyword model is compatible with the keyword detection unit and storing the second version of the keyword model.

7. The method of claim 1, wherein assigning the particular target keyword to the function comprises combining the keyword model with at least one other keyword model associated with a second particular target keyword from the plurality of target keywords to form a combined keyword model, and wherein the second particular target keyword is associated with at least one other function of the electronic device.

8. The method of claim 7, further comprising:
receiving the input sound at the electronic device;
detecting, at the electronic device, whether the particular target keyword, the second particular target keyword, or a combination thereof, is included in the input sound based on the combined keyword model;
performing the function in response to detecting that the particular target keyword is included in the input sound; and
performing the at least one other function in response to detecting that the second particular target keyword is included in the input sound.

9. The method of claim 1, wherein the keyword data file includes an application file, and further comprising extracting the keyword model from the application file, wherein the function to which the particular target keyword is assigned includes activating the application file.

10. The method of claim 1, further comprising receiving a voice tone model associated with the particular target keyword, wherein the voice tone model is adapted to modify a voice tone of speech output by the electronic device.

11. The method of claim 10, wherein the voice tone model is adapted to modify the voice tone of speech that is converted from text, and further comprising:
receiving the input sound at the electronic device;
detecting the particular target keyword in the input sound based on the keyword model; and
in response to detecting that the particular target keyword is included in the input sound, modifying the voice tone of the speech converted from the text based on the voice tone model associated with the particular target keyword.

12. The method of claim 1, further comprising:
receiving the input sound at the electronic device;
detecting the particular target keyword in the input sound based on the keyword model; and
in response to detecting that the particular target keyword is included in the input sound, activating the function, wherein activating the function comprises executing instructions causing the electronic device to perform the function.

13. The method of claim 1, wherein the function comprises activating a voice assistant, activating a camera, activating a music player, activating a voice recorder, taking a photograph, unlocking the electronic device, or a combination thereof.

14. The method of claim 1, further comprising receiving a selection of the function via a user interface of the electronic device prior to assigning the particular target keyword to the function.

15. An electronic device comprising:
a user interface unit to receive input selecting a particular target keyword from a list of a plurality of target keywords;
a download management unit configured to receive, via a communication network in response to the input, a keyword data file, the keyword data file including a keyword model for the particular target keyword and including compatibility information;
a verification unit configured to determine whether the keyword data file is compatible with a keyword detection unit based on the compatibility information, wherein the download management unit is configured to receive a second version of the keyword model based on a determination that the keyword data file is not compatible with the keyword detection unit; and
a keyword setting unit configured to assign the particular target keyword to a function of the electronic device in response to the input such that the function is activated in response to detecting, based on the keyword model, that an input sound received at the electronic device includes the particular target keyword.

16. The electronic device of claim 15, wherein the download management unit is further configured to receive response sound data, the response sound data used to generate a response sound indicative of detection of the particular target keyword is included in the input sound.

17. The electronic device of claim 16, further comprising:
a sound sensor configured to receive the input sound, wherein the keyword detection unit is configured to detect whether the particular target keyword is included in the input sound based on the keyword model; and
a function management unit configured to generate the response sound based on the response sound data associated with the particular target keyword in response to detecting that the particular target keyword is included in the input sound.

18. The electronic device of claim 15, wherein the download management unit is further configured to receive a voice tone model adapted to modify a voice tone of speech converted from text.

19. The electronic device of claim 18, further comprising:
a sound sensor configured to receive the input sound;

a keyword detection unit configured to detect that the particular target keyword is included in the input sound based on the keyword model; and a text-to-speech (TTS) conversion unit configured to modify the voice tone of the speech converted from the text based on the voice tone model in response to detection of the particular target keyword in the input sound.

20. The electronic device of claim 15, wherein the keyword setting unit is further configured to combine the keyword model with at least one other keyword model associated with a second particular target keyword to form a combined keyword model, wherein the second particular target keyword is associated with at least one other function of the electronic device.

21. The electronic device of claim 20, further comprising:
a sound sensor configured to receive the input sound;
a keyword detection unit configured to detect whether keywords are included in the input sound based on the combined keyword model; and
a function management unit configured to:
activate the function in response to detection of the particular target keyword in the input sound based on the combined keyword model; and
activate the at least one other function in response to detection of the second particular target keyword in the input sound based on the combined keyword model.

22. The electronic device of claim 15, wherein the download management unit is configured to receive, via the communication network, an application file, wherein the application file includes the keyword data file, and further comprising an extracting unit configured to extract the keyword data file from the application file, wherein the keyword setting unit is configured to assign the particular target keyword to the application file for activating the application in response to detecting the particular target keyword in the input sound based on the keyword model.

23. The electronic device of claim 22, further comprising:
a sound sensor configured to receive the input sound;
a keyword detection unit configured to detect whether the particular target keyword is included in the input sound based on the keyword model; and
a function management unit configured to activate the application in response to detecting the particular target keyword is included in the input sound.

24. The electronic device of claim 15, further comprising:
a sound sensor configured to receive the input sound;
a keyword detection unit configured to detect whether the particular target keyword is included in the input sound based on the keyword model; and
a function management unit configured to perform the function in response to detecting that the particular target keyword is included in the input sound.

25. An electronic device comprising:
means for receiving input selecting a particular target keyword from a list of a plurality of target keywords;
means for receiving, via a communication network in response to the particular target keyword, a keyword data file, the keyword data file including a keyword model for the particular target keyword and including compatibility information;
means for determining, based on the compatibility information, whether the keyword data file is compatible with means for detecting keywords in an input sound, wherein the means for receiving the keyword data file is configured to receive a second version of the keyword model based on a determination that the keyword data file is not compatible with the means for detecting keywords in the input sound; and
means for assigning the particular target keyword to a function in response to the input such that the function is activated in response to detecting, based on the keyword model, that the input sound received at the electronic device includes the particular target keyword.

26. The electronic device of claim 25, wherein the means for receiving the keyword model is configured to receive response sound data, wherein the means for detecting keywords is configured to determine whether the particular target keyword is included in the input sound and further comprising:
means for receiving the input sound; and
means for generating a response sound based on the response sound data associated with the particular target keyword in response to detecting that the particular target keyword is included in the input sound.

27. The electronic device of claim 25, further comprising:
means for extracting the keyword model from the keyword data file in response to a determination that the keyword data file is compatible with the means for detecting keywords in the input sound.

28. The electronic device of claim 27, wherein the second version of the keyword model is compatible with the means for detecting keywords and further comprising storing the second version of the keyword model.

29. A non-transitory computer-readable storage medium storing instructions, the instructions causing a processor to:
receive, at an electronic device, a list of a plurality of target keywords, the list received via a communication network;
receive user input that selects a particular target keyword from the list of the plurality of target keywords; and
in response to the user input:
receive a keyword data file via the communication network, the keyword data file including a keyword model for the particular target keyword and including compatibility information;
determine whether the keyword data file is compatible with the electronic device based on the compatibility information;
receive a second version of the keyword model based on a determination that the keyword data file is not compatible with a keyword detection unit; and
assigning, at the electronic device, the particular target keyword to a function of the electronic device such that the function is activated in response to detecting, based on the keyword model, that an input sound received at the electronic device includes the particular target keyword.

30. The non-transitory computer-readable storage medium of claim 29, wherein the keyword model is non-user specific and includes information to model a subset of phonemes of a language of the particular target keyword.

* * * * *